(12) United States Patent
Lee

(10) Patent No.: US 7,110,796 B2
(45) Date of Patent: Sep. 19, 2006

(54) PORTABLE TERMINAL DEVICE HAVING A DISPLAY UNIT UTILIZING A HOLOGRAPHIC SCREEN

(75) Inventor: Seog-Geun Lee, Kumi-shi (KR)

(73) Assignee: Samsung Electronics Co., Ltd., (KR)

( * ) Notice: Subject to any disclaimer, the term of this patent is extended or adjusted under 35 U.S.C. 154(b) by 563 days.

(21) Appl. No.: 10/262,822

(22) Filed: Oct. 2, 2002

(65) Prior Publication Data

US 2003/0114200 A1 Jun. 19, 2003

(30) Foreign Application Priority Data

Dec. 14, 2001 (KR) ................ 2001-79185

(51) Int. Cl.
*H04B 1/38* (2006.01)
*H04M 1/00* (2006.01)
(52) U.S. Cl. ............ 455/566; 345/32; 379/433.04
(58) Field of Classification Search .......... 455/550.1, 455/566, 575.1; 345/901, 905, 32, 156, 7; 348/759, 760; 379/433.04
See application file for complete search history.

(56) References Cited

U.S. PATENT DOCUMENTS

| 5,035,474 A | 7/1991 | Moss et al. |
| 5,124,821 A | 6/1992 | Antier et al. |
| 5,483,250 A * | 1/1996 | Herrick ........................ 345/32 |
| 5,970,418 A * | 10/1999 | Budd et al. ................. 455/566 |
| 6,054,941 A | 4/2000 | Chen |
| 6,292,305 B1 | 9/2001 | Sakuma et al. |
| 6,464,358 B1 * | 10/2002 | Shirakura et al. ............... 353/7 |
| 6,512,607 B1 | 1/2003 | Windsor et al. |
| 6,525,750 B1 * | 2/2003 | Knox ............................ 345/30 |
| 2001/0038412 A1 | 11/2001 | McNelley et al. |

FOREIGN PATENT DOCUMENTS

| EP | 0 597 500 | 11/1993 |
| EP | 0 833 486 | 4/1998 |
| WO | WO 00/07058 | * 10/2000 |

OTHER PUBLICATIONS

European Search Report dated May 14, 2003, issued in a counterpart application, namely, Appln. No. 02025053.6.

* cited by examiner

*Primary Examiner*—Nguyen T. Vo
(74) *Attorney, Agent, or Firm*—Dilworth & Barrese LLP

(57) ABSTRACT

A portable terminal device, which employs a display unit utilizing a holographic screen, a main housing, a holographic screen, and an optical system. The holographic screen is disposed at a predetermined portion of the main housing while being exposed to an exterior of the main housing. The holographic screen optically displays information by means of image-light which is projected to the holographic screen. The optical system is spaced apart from the holographic screen and provides the holographic screen with the image-light.

5 Claims, 18 Drawing Sheets

PORTABLE TERMINAL DEVICE HAVING A DISPLAY UNIT UTILIZING A HOLOGRAPHIC SCREEN

PRIORITY

This application claims priority to an application entitled "Portable Terminal Device Having A Display Unit Utilizing A Holographic Screen" filed in the Korean Industrial Property Office on Dec. 14, 2001 and assigned Serial No. 2001-79185, the contents of which are hereby incorporated by reference.

BACKGROUND OF THE INVENTION

1. Field of the Invention

The present invention relates to a portable terminal device such as a cellular phone, a digital phone, a Personal Digital Assistant (PDA), a Hand Held Phone (HHP), a notebook computer, a Palm PC, or a Tablet computer, which necessarily requires a data display unit, and more particularly to a portable terminal device, which employs a display unit utilizing holographic technology.

2. Description of the Related Art

In general, a portable terminal device is a portable device which performs wireless communication with a base station, thereby enabling a user of the device to communicate with another person. Portable terminal devices can be classified into various types according their shapes or functions, or the locations of the human body at which they are carried. According to their shapes, the portable terminal devices may be classified into portable terminal devices of the bar type, flip type, folder type, flip-up type, and folder type usable for both PDA and mobile phone. Further, according to their functions, the portable terminal devices may be classified into devices for voice communication, image communication, Internet surfing, Internet games, and chatting. Further, according to the locations of the human body at which they are carried, the portable terminal devices may be classified into around-the neck types, around-the wrist types, and in-the-pocket types.

All the portable terminal devices as described above must have an antenna, a data input/output means, and a data transmission/reception means, in order to perform the communication function. In general, a keypad or a touch sensitive panel is employed as the data input means. In this case, a user can input data by pressing desired keys among a plurality of keys arranged on the keypad or by touching the touch sensitive panel. As the data output means, a display unit such as an LCD module is generally used. Further, the data transmission/reception means generally includes a microphone and a speaker.

Existing portable terminal devices generally employ a display system known as an LCD which stands for a liquid crystal display, in order to optically display various data or information. In a typical LCD, a liquid crystal layer is sandwiched between two transparent glass plates, and polarizer plates are each attached to each outer surface of the upper and lower transparent glass plates. Further, a reflection sheet may be attached to the bottom of the lower polarizer plate. An LCD provided with the reflection sheet is called a reflection LCD, while an LCD provided with no reflection sheet is called a projection LCD. The construction of the existing LCD as described above can be easily understood by those related in the art.

However, the conventional LCD which has been widely used as a display system in the prior art is relatively wide and thick, which impose restrictions on the size-reduction of a portable terminal device. Especially, in the case where the LCD and a main printed circuit board mounting various circuit elements thereon are mounted to different housings such as a terminal housing and a folder housing, a portable terminal device must inevitably employ electric wires or flexible printed circuit board (FPCB) capable of establishing electric connection between the LCD and the main printed circuit board, thereby enabling signal transmission between the LCD and the main printed circuit board. In this case, the electric connection as described above may be easily broken when the portable terminal device is dropped or impacted. Moreover, since rotational force is usually applied to the connection elements, the breaking of electric connection as described above is a severe problem in the existing portable terminal device.

SUMMARY OF THE INVENTION

Accordingly, the present invention has been made to solve the above-mentioned problems occurring in the prior art, and an aspect of the present invention is to provide a portable terminal device which is advantageous in making a body of the portable terminal device slimmer.

It is another aspect of the present invention to provide a portable terminal device which has a display unit utilizing a holographic screen.

In order to accomplish this aspect, there is provided a portable terminal device comprising a main housing, a holographic screen disposed at a predetermined portion of the main housing while being exposed to an exterior of the main housing, the holographic screen optically displaying information by means of image-light which is projected to the holographic screen, and an optical system spaced apart from the holographic screen and providing the holographic screen with the image-light.

In accordance with another aspect of the present invention, there is provided a portable terminal device comprising a main housing, an auxiliary housing extending from the main housing in a longitudinal direction of the main housing, a hinge means protruding upward between the main housing and the auxiliary housing, and a folder assembled with the hinge means in such a manner that the folder can be rotated about the hinge means to open or cover the main housing, the folder including an LCD, the folder being disposed nearer to the auxiliary housing or the main housing according to rotation of the folder. The auxiliary housing comprises: a holographic screen optically displaying information by means of image-light which is projected to the holographic screen; and an optical system spaced apart from the holographic screen and providing the holographic screen with the image-light.

In accordance with another aspect of the present invention, there is provided a portable terminal device comprising a main housing an auxiliary housing extending from the main housing in a longitudinal direction of the main housing, a hinge means protruding upward between the main housing and the auxiliary housing, a holographic screen assembled with the hinge means in such a manner that the holographic screen can be rotated about the hinge means to open or cover the main housing, the holographic screen being disposed nearer to the auxiliary housing or the main housing according to rotation of the folder, the holographic screen optically displaying information by means of image-light which is projected to the holographic screen, and an optical system spaced apart from the holographic screen, the optical system providing the holographic screen with the image-light when the holographic screen is opened from the main housing while being inclined at a predetermined angle.

In accordance with another aspect of the present invention, there is provided a portable terminal device comprising a main housing, an auxiliary housing extending from the main housing in a longitudinal direction of the main housing, a hinge means protruding upward between the main housing and the auxiliary housing, a folder assembled with the hinge means in such a manner that the folder can be rotated about the hinge means to open or cover the main housing, the folder being disposed nearer to the auxiliary housing or the main housing according to rotation of the folder, and a display unit comprising a first display sub-unit for displaying information when the folder is closed onto the main housing, and second display sub-unit for displaying information when the folder is opened from the main housing. The first display sub-unit comprises a first holographic screen optically displaying information by means of first image-light which is projected to the first holographic screen, the first holographic screen being disposed on the auxiliary housing, and a first optical system spaced apart from the first holographic screen and providing the first holographic screen with the first image-light. The second display sub-unit comprises a second holographic screen optically displaying information by means of second image-light which is projected to the second holographic screen, the second holographic screen being disposed on the folder and a second optical system spaced apart from the second holographic screen and providing the second holographic screen with the second image-light.

In accordance with another aspect of the present invention, there is provided a portable terminal device comprising a main housing an auxiliary housing rotatably assembled with one end of the main housing through a hinge means a holographic screen rotatably assembled between the main housing and auxiliary housing by means of the hinge means, the holographic screen being disposed nearer to the auxiliary housing or the main housing according to rotation of the folder, the holographic screen optically displaying information by means of image-light which is projected to the holographic screen and an optical system mounted to the auxiliary housing and providing the holographic screen with the image-light.

In accordance with another aspect of the present invention, there is provided a portable terminal device comprising a main housing, an auxiliary housing rotatably assembled with one end of the main housing through a hinge means, a holographic screen rotatably assembled between the main housing and auxiliary housing by means of the hinge means, the holographic screen being disposed nearer to the auxiliary housing or the main housing according to rotation of the folder, the holographic screen optically displaying information by means of image-light which is projected to the holographic screen, and an optical system mounted to the main housing and providing the holographic screen with the image-light.

In accordance with another aspect of the present invention, there is provided a portable terminal device comprising a housing at one section of which a keypad having a plurality of keys arranged on the keypad is disposed, a holographic screen assembled with the housing in such a manner that the holographic screen can be rotated about a rotation axis which extends transversely through both sides of the housing, the holographic screen optically displaying information by means of image-light which is projected to the holographic screen, and an optical system disposed at another section of the housing, the optical system providing the holographic screen with the image-light when the holographic screen is opened from the housing while being inclined at a predetermined angle.

In accordance with another aspect of the present invention, there is provided a portable terminal device comprising, a main housing, a holographic screen rotatably assembled with the main housing by means of a hinge means, the holographic screen optically displaying information by means of image-light which is projected to the holographic screen, and an optical system mounted to the main housing and providing the holographic screen with the image-light.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may make the subject matter of the present invention rather unclear.

Figure 1:
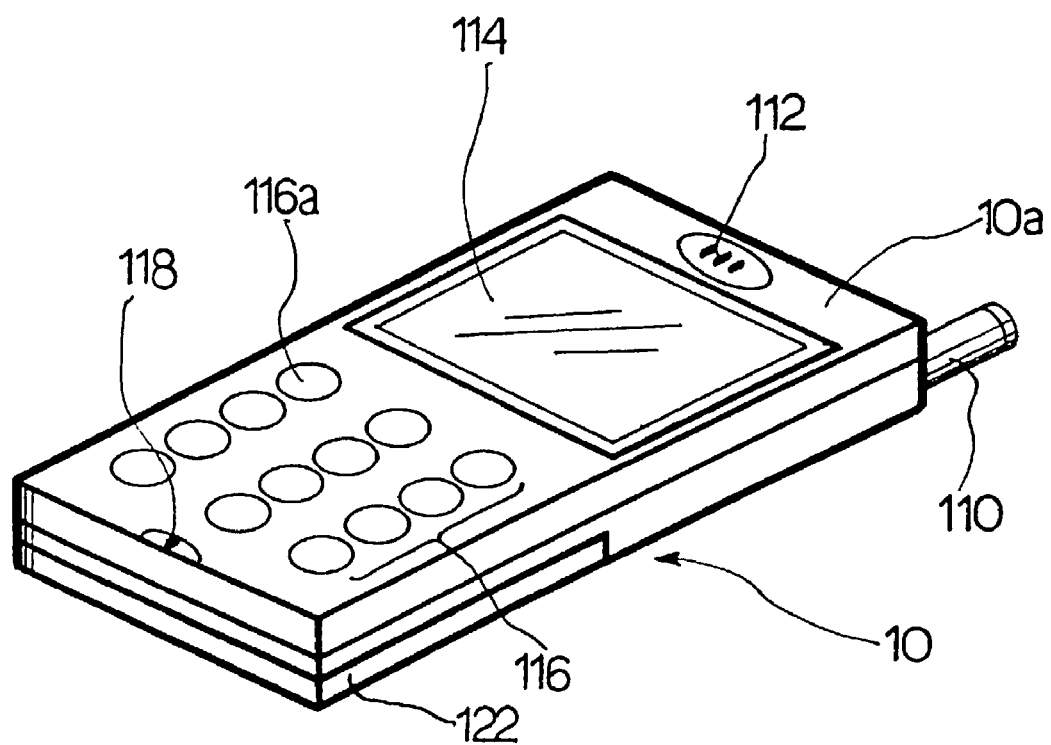
FIG. 1 is a perspective view of a portable terminal device employing a display unit according to the first preferred embodiment of the present invention.
Figure 2:
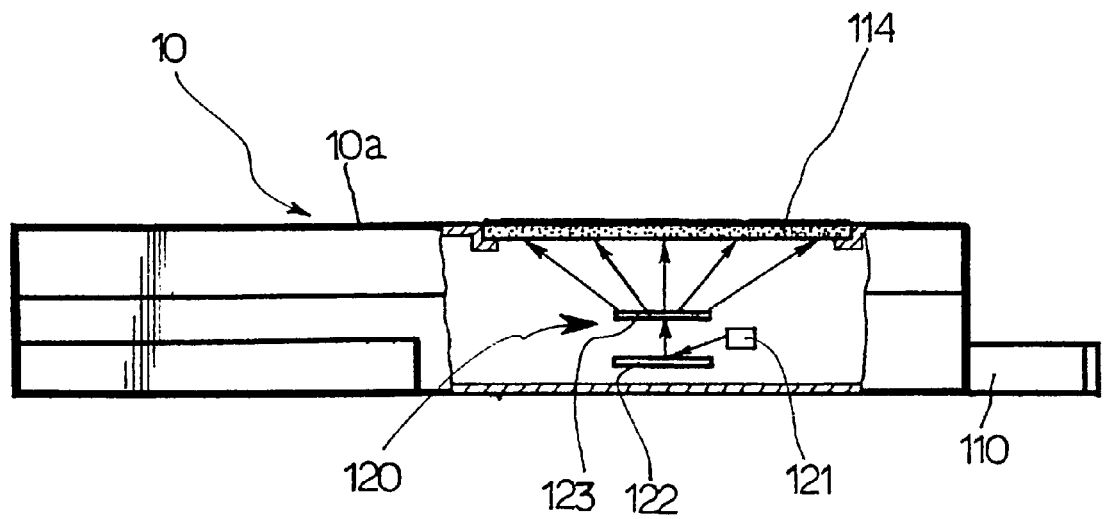
FIG. 2 is a partly cut-out side view of a portable terminal device shown in FIG. 1, which shows the construction of an optical system employed therein.

FIGS. 1 and 2 shows a bar type portable terminal device employing a display unit according to the first preferred embodiment of the present invention. As shown in FIGS. 1 and 2, the display unit includes a holographic screen 114 and an optical system 120 for projecting image-light on the holographic screen 114.

In the bar type portable terminal device, an antenna 110, a speaker 112, the holographic screen 114 of the display unit, a keypad 116, and a microphone 118 are arranged in sequence on a front surface of a main housing 10 having a bar shape. The antenna 110 protrudes from the upper end of the main housing 10 in the longitudinal direction of the main housing 10. The display unit includes the holographic screen 114 and the optical system 120 projecting image-light the holographic screen 114. The holographic screen 114 is disposed at a predetermined portion on an upper surface 10a of the main housing 10 while being exposed to the exterior of the portable terminal device. The optical system 120 is disposed under and spaced apart from the holographic screen 114, and projects image-light on the holographic screen 114.

Specifically, the optical system 120 includes an optic source 121, a microdisplay LCD 122, and an optical projection element 123. The optic source 121 is disposed at a predetermined position under the holographic screen 114. The microdisplay LCD 122 is spaced apart from the optic source 121, and receives light emitted from the optic source 121 and emits image-light by means of the received light. The optical projection element 123 is arranged between the holographic screen 114 and the microdisplay LCD 122, and causes the parallel image-light, which is reflected from the microdisplay LCD 122, to diverge toward the holographic screen 114. It is preferred that the optic source 121 is a light-emitting diode, more preferably one selected from white, red, or blue light-emitting diodes. It is also preferred that the microdisplay LCD 122 is a reflection LCD and the optical projection element 123 is a divergence lens. In this case, the reflection LCD means an LCD to the bottom of which a reflection sheet (not shown) is attached. Further, it is preferred that the holographic screen 114 is a holographic projection screen, since the image-light having passed through the divergence lens 123 is shed on the rear surface of the holographic screen 114.

The keypad 116 includes a plurality of keys 116a arranged thereon, specifically, keys 116a which can be touched to input data by fingers. The keys 116a may include number keys, letter keys, function keys, a communication key, a deletion key and so on. Further, the microphone 118 is disposed under the keypad 116, and a battery pack 122a for supplying electric power is assembled with the main housing 10.

According to the construction described above, when light is emitted from the optic source 121 toward the microdisplay LCD 122, the emitted light is shed on and is converted to image-light by the microdisplay LCD 122, and then the image-light is transmitted toward the optical projection element 123 from the microdisplay LCD 122. Thereafter, the image-light diverges while passing through the optical projection element 123, and is then shed on the rear surface of the holographic screen 114. When the image-light is shed on the rear surface of the holographic screen 114 in this way, a user can view holographic images displayed by the holographic screen 114 in a comfortable posture.

Figure 3:
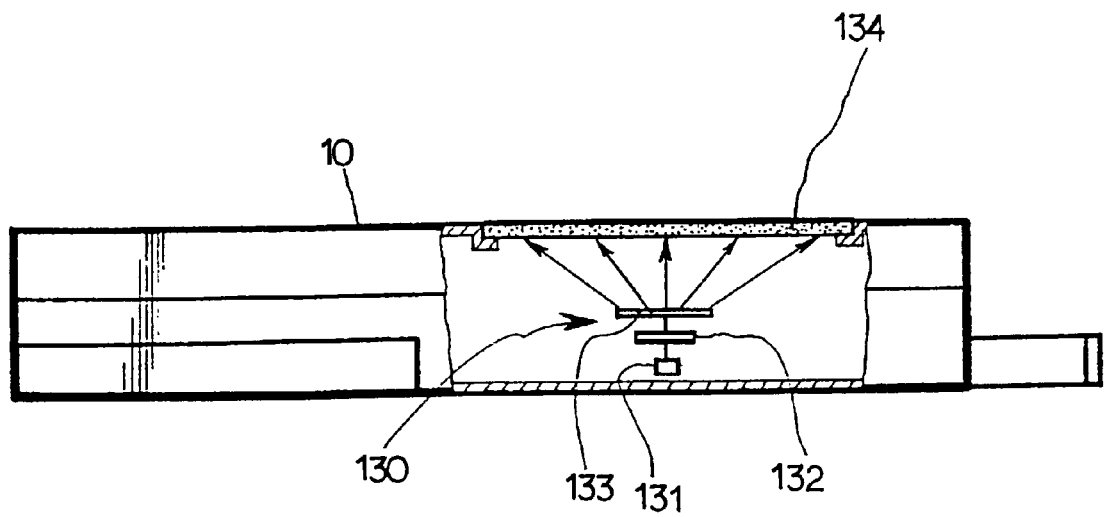
FIG. 3 is a partly cut-out side view of a portable terminal device employing a display unit according to the second preferred embodiment of the present invention.

FIG. 3 is a side sectional view of a portable terminal device having a display unit according to the second preferred embodiment of the present invention. As shown in FIG. 3, the display unit includes a holographic screen 134 and an optical system 130 for projecting image-light on the holographic screen 134. The holographic screen 134 is disposed at a predetermined portion on the upper surface 10a of the main housing 10 while being exposed to the exterior of the portable terminal device. The optical system 130 is disposed under and spaced apart from the holographic screen 134, and projects image-light on the holographic screen 134.

Specifically, the optical system 130 includes an optic source 131, a microdisplay LCD 132, and an optical projection element 133. The optic source 131 is disposed at a predetermined position under the holographic screen 134. The microdisplay LCD 132 is disposed above and spaced apart from the optic source 131, and receives light emitted from the optic source 131 and emits image-light by means of the received light. The optical projection element 133 is arranged between the holographic screen 134 and the microdisplay LCD 132, and causes the parallel image-light, which is incident from the microdisplay LCD 132, to diverge toward the holographic screen 134. It is preferred that the optic source 131 is a light-emitting diode, more preferably one selected from white, red, or blue light-emitting diodes. It is also preferred that the microdisplay LCD 132 is a projection LCD since the optic source 131 is disposed under the microdisplay LCD 132, and that the optical projection element 133 is a divergence lens. Further, it is preferred that the holographic screen 134 is a holographic projection screen, since the image-light having passed through the divergence lens 133 is shed on the rear surface of the holographic screen 134.

Figure 4A:
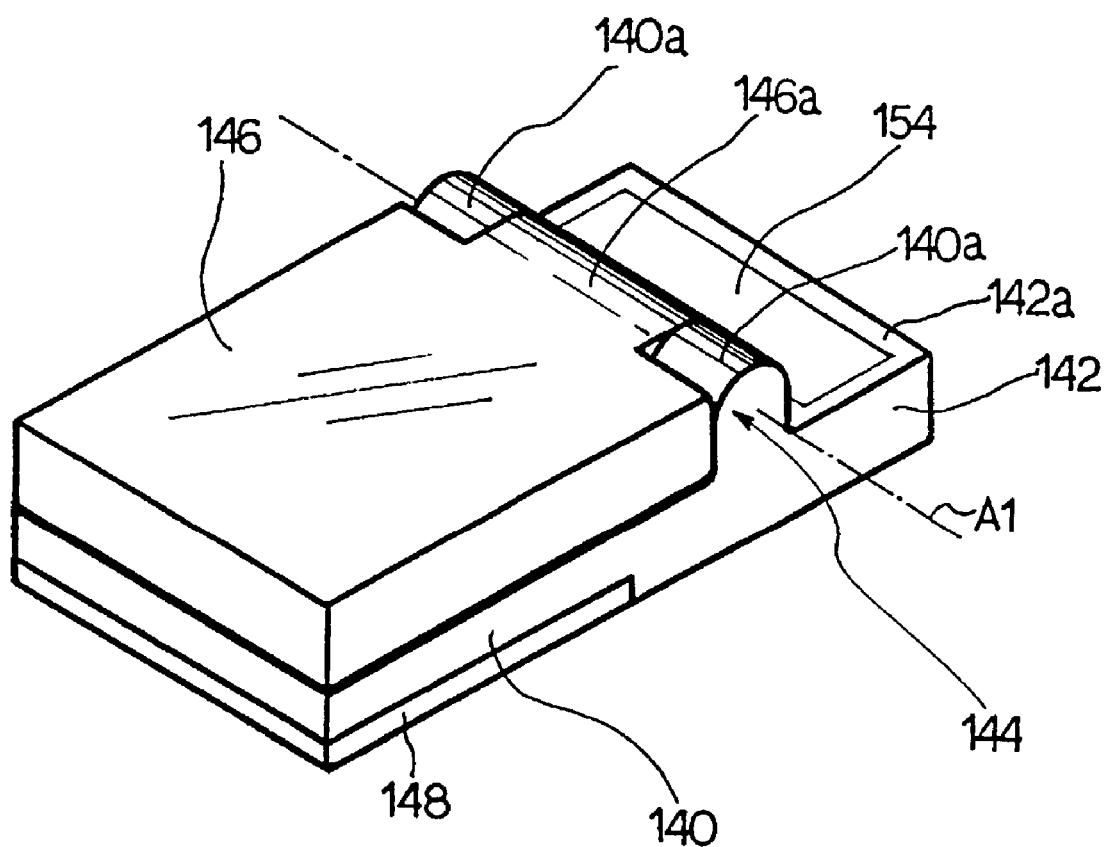
FIG. 4A is a perspective view of a portable terminal device employing a display unit according to the third preferred embodiment of the present invention, when a folder of the terminal is closed.
Figure 4B:
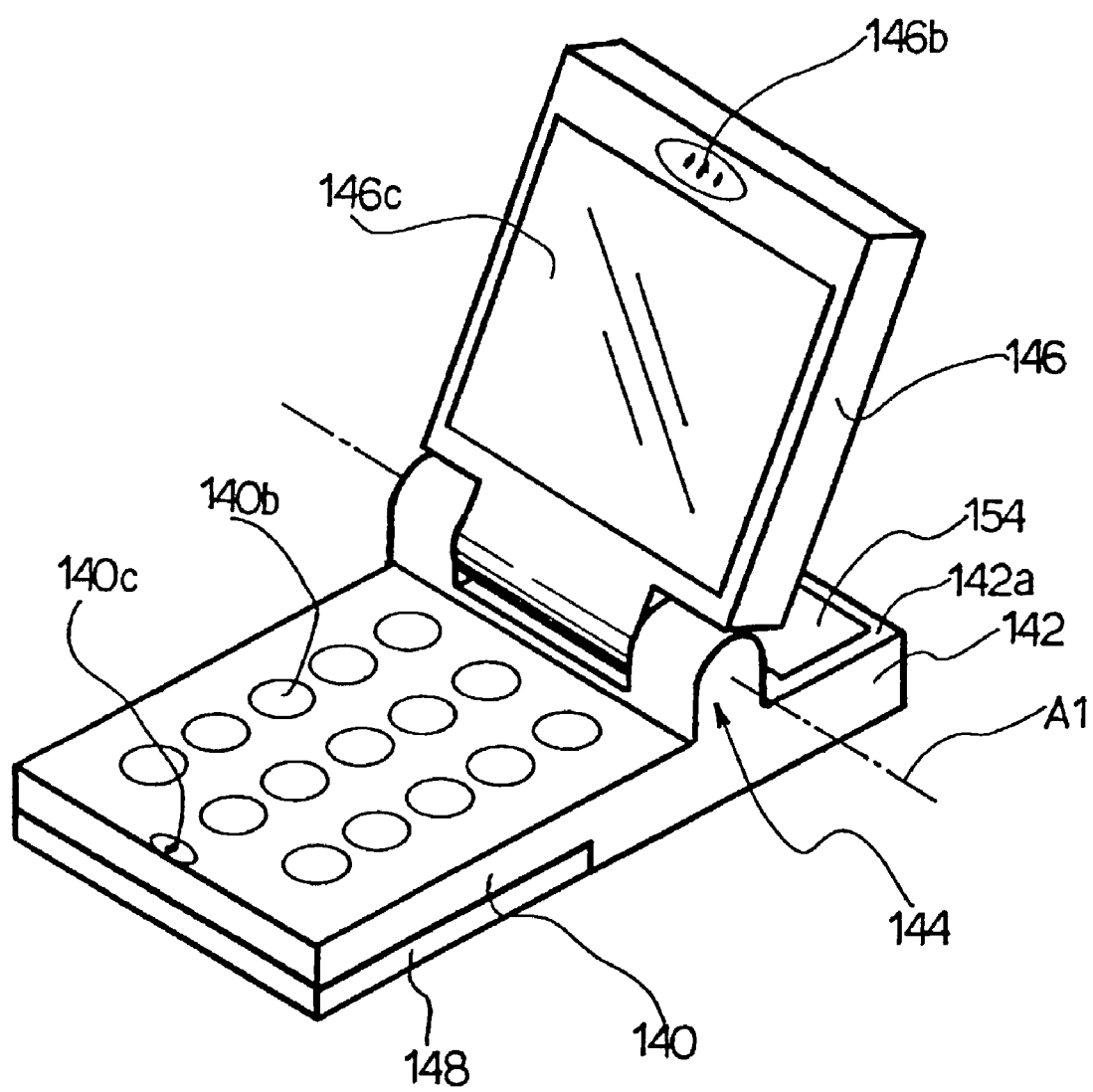
FIG. 4B is a perspective view of a portable terminal device employing a display unit according to the third preferred embodiment of the present invention, when a folder of the terminal is open.
Figure 5:
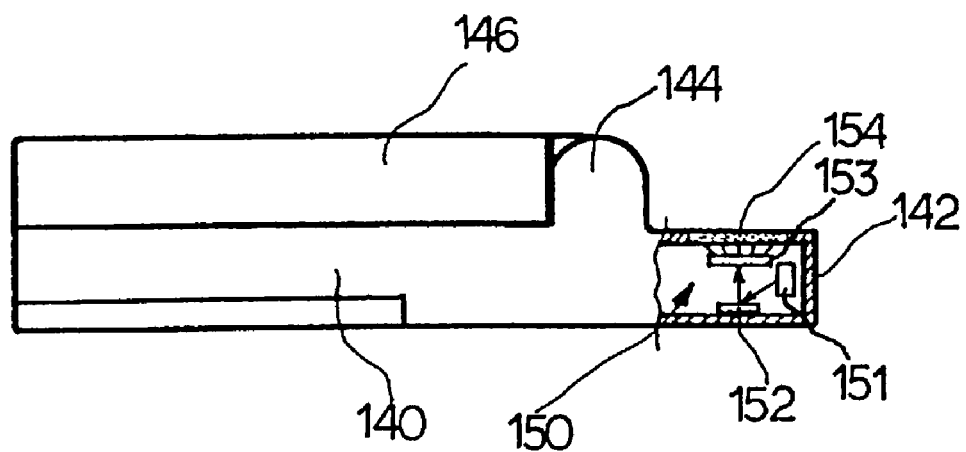
FIG. 5 is a partly cut-out side view of a portable terminal device shown in FIGS. 4A and 4B, which shows the construction of an optical system employed therein.

FIGS. 4A, 4B, and 5 are perspective views and a partly cut-out side view of a folder type portable terminal device employing a display unit according to the third embodiment of the present invention. As shown in FIGS. 4A to 5, the portable terminal device includes a main housing 140, an auxiliary housing 142 formed integrally with and extending longitudinally from the main housing 140, a hinge means 144 protruding upward and disposed between the main housing 140 and the auxiliary housing 142, and a folder 146 connected with the main housing 140 by means of the hinge means 144 so that the folder 146 can be rotated to open or close the front surface of the main housing 140. A hinge axis A1 of the hinge means 144 extends through a portion of the hinge means 144, which is slightly distanced upward from the front surface of the main housing 140. The folder 146 is rotated to open or close the front surface of the main housing 140. When the folder 146 has been completely rotated to open the main housing 140, the folder 146 is located nearer to the auxiliary housing 142 than the main housing 140. Further, a battery pack 148 is detachably assembled with the main housing 140.

The hinge means 144 includes side hinge arms 140a formed integrally with the main housing 140, and a center hinge arm 146a formed integrally with the folder 146 and disposed between the side hinge arms 140a. The side hinge arms 140a and the center hinge arm 146a are connected with each other by a hinge module which is not shown.

The main housing 140 includes 140c and a keypad 140b on which a plurality of keys are arranged. The folder 146 includes a speaker 146b and an LCD module 146c. When the folder 146 is rotated from and opens the main housing 140, information can be displayed on the LCD module 146c. In contrast, when the folder 146 covers over the main housing 140, information is displayed on a holographic screen 154 arranged on the auxiliary housing 142.

The display unit utilizing a holographic screen according to the third embodiment of the present invention includes a holographic screen 154 disposed on the upper surface of the auxiliary housing 142, and an optical system 150 received in the auxiliary housing 142 and disposed under the holographic screen 154. The holographic screen 154 is disposed at a predetermined portion on an upper surface 142a of the auxiliary housing 142 while being exposed to the exterior. The optical system 150 is disposed under and spaced apart from the holographic screen 154, and projects image-light on the holographic screen 154.

Specifically, the optical system 150 includes an optic source 151, a microdisplay LCD 152, and an optical projection element 153. The optic source 151 is disposed under and near the holographic screen 154. The microdisplay LCD 152 is spaced apart from the optic source 151, and receives light emitted from the optic source 151 and emits image-light by means of the received light. The optical projection element 153 is arranged between the holographic screen 154 and the microdisplay LCD 152, and enables the image-light, which is reflected from the microdisplay LCD 152, to diverge toward the holographic screen 154. It is preferred that the optic source 151 is a light-emitting diode, more preferably one selected from white, red, or blue light-emitting diodes. It is also preferred that the microdisplay LCD 152 is a reflection LCD and the optical projection element 153 is a divergence lens. In this case, the reflection LCD means an LCD to the bottom of which a reflection sheet (not shown) is attached. Further, it is preferred that the holographic screen 154 is a holographic projection screen, since the image-light having passed through the divergence lens 153 is shed on the rear surface of the holographic screen 154.

Figure 6:
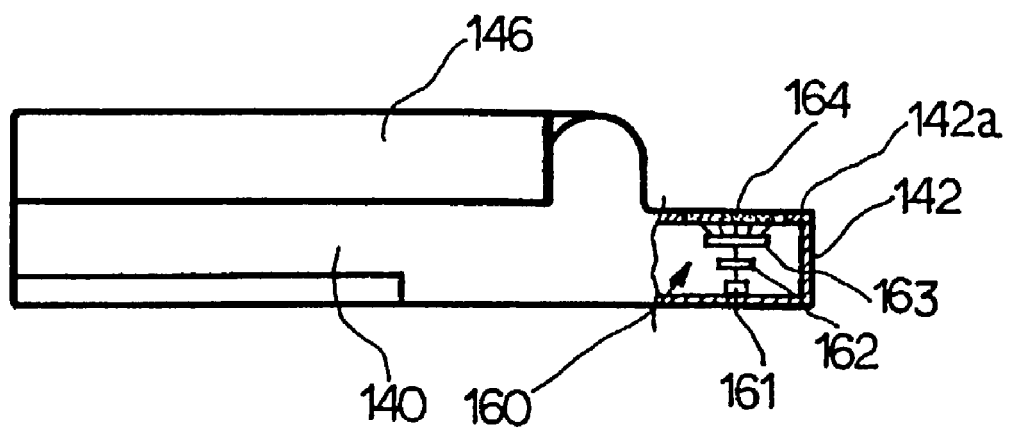
FIG. 6 is a partly cut-out side view of a portable terminal device employing a display unit according to the fourth preferred embodiment of the present invention.

FIG. 6 is a partly cut-out side view of a folder type portable terminal device employing a display unit according to the fourth embodiment of the present invention. As shown in FIG. 6, the display unit includes a holographic screen 164 disposed on the upper surface of the auxiliary housing 142, and an optical system 160 received in the auxiliary housing 142 and disposed under the holographic screen 164. The holographic screen 164 is disposed at a predetermined portion on the upper surface 142a of the auxiliary housing 142 while being exposed to the exterior. The optical system 160 is disposed under and spaced apart from the holographic screen 164, and projects image-light on the holographic screen 164.

Specifically, the optical system 160 includes an optic source 161, a microdisplay LCD 162, and an optical projection element 163. The optic source 161 is disposed under and near the holographic screen 164. The microdisplay LCD 162 is disposed above and spaced apart from the optic source 161, and receives light emitted from the optic source 161 and emits image-light by means of the received light. The optical projection element 163 is arranged between the holographic screen 164 and the microdisplay LCD 162, and enables the image-light, which is projected from the microdisplay LCD 162, to diverge toward the holographic screen 164. It is preferred that the optic source 161 is a light-emitting diode, more preferably one selected from white, red, or blue light-emitting diodes. It is also preferred that the microdisplay LCD 162 is a projection LCD since the optic source 161 is disposed under the microdisplay LCD 162, and that the optical projection element 163 is a divergence lens. Further, it is preferred that the holographic screen 164 is a holographic projection screen, since the image-light having passed through the divergence lens 163 is shed on the rear surface of the holographic screen 164.

Figure 7:
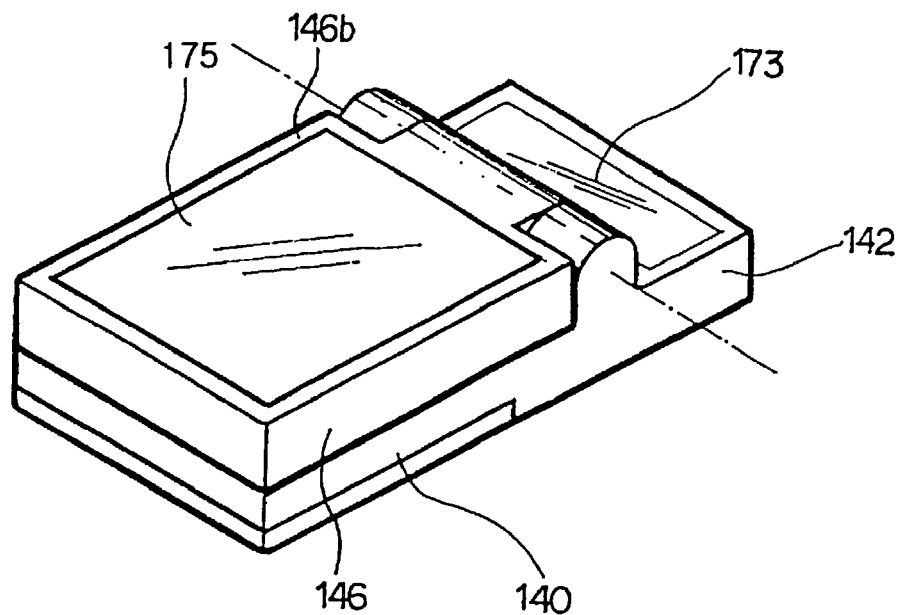
FIG. 7 is a perspective view of a portable terminal device employing a display unit according to the fifth preferred embodiment of the present invention.
Figure 8:
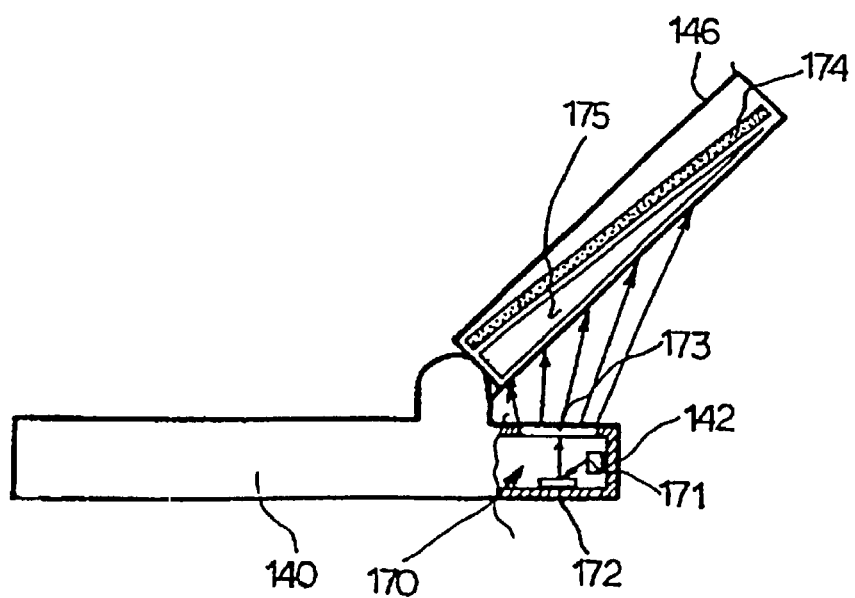
FIG. 8 is a partly cut-out side view of a portable terminal device shown in FIG. 7, which shows the construction of an optical system employed therein.

FIGS. 7 and 8 are a perspective view and a partly cut-out side view, respectively, of a folder type portable terminal device employing a display unit according to the fifth embodiment of the present invention. As shown in FIGS. 7 and 8, the portable terminal device employing a display unit according to the fifth embodiment of the present invention includes a main housing 140, an auxiliary housing 142 formed integrally with and extending longitudinally from the main housing 140, a hinge means 144 disposed between the main housing 140 and the auxiliary housing 142, and a folder 146 connected with the hinge means 144 so that the folder 146 can be rotated to open or close the front surface of the main housing 140. Especially, a holographic screen 174 is disposed on the folder 146, and an optical system 170 is arranged in the auxiliary housing 142 extending longitudinally from the main housing 140.

Specifically, the display unit includes a holographic screen 174 and an optical system 170. The holographic screen 174 is disposed on the rear surface 146b of the folder 146, and the optical system 170 is received in the auxiliary housing 142. The optical system 170 projects image-light on the holographic screen 174 when the folder 146 is completely opened while being inclined at a predetermined angle.

More specifically, the optical system 170 includes an optic source 171, a microdisplay LCD 172, and an optical projection element 173. The optic source 171 is received in the auxiliary housing 142. The microdisplay LCD 172 is spaced apart from the optic source 171, and receives light emitted from the optic source 171 and emits image-light by means of the received light. The optical projection element 173 is disposed at a predetermined portion of the upper surface of the auxiliary housing 142, and causes the image-light, which is incident from the microdisplay LCD 172, to diverge toward the holographic screen 174. It is preferred that the optic source 171 is a light-emitting diode, more preferably one selected from white, red, or blue light-emitting diodes. It is also preferred that the microdisplay LCD 172 is a reflection LCD since the optic source 171 is disposed above the microdisplay LCD 172, and the optical projection element 173 is a divergence lens. Further, it is preferred that the holographic screen 174 is a holographic projection screen, since the image-light having passed through the divergence lens 173 is shed on the rear surface of the holographic screen 174.

Additionally, a light-diverging medium 175 is opposed to the folder 146, specifically, with the holographic screen 174. The light-diverging medium 175 is a medium having a refractivity different from that of the holographic screen 174, so that the light-diverging medium 175 causes the image-light, which is incident from the holographic screen 174, to diverge, thereby enabling a user to view clearer images.

Figure 9:
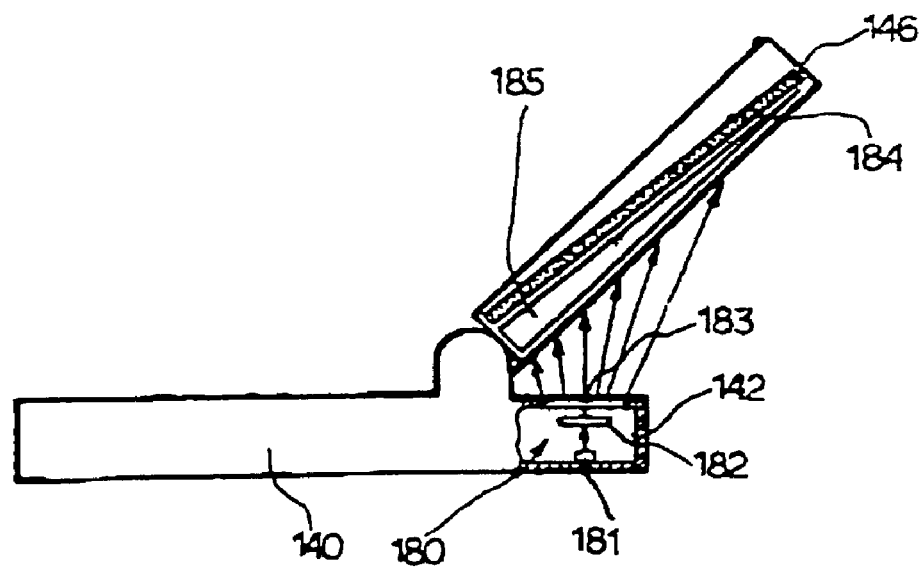
FIG. 9 is a partly cut-out side view of a portable terminal device employing a display unit according to the sixth preferred embodiment of the present invention.

FIG. 9 is a partly cut-out side view of a folder type portable terminal device employing a display unit according to the sixth embodiment of the present invention. As shown in FIG. 9, the portable terminal device employing a display unit according to the sixth embodiment of the present invention includes a main housing 140, an auxiliary housing 142 formed integrally with and extending longitudinally from the main housing 140, a hinge means 144 disposed between the main housing 140 and the auxiliary housing 142, and a folder 146 connected with the hinge means 144 so that the folder 146 can be rotated to open or close the front surface of the main housing 140. Especially, a holographic screen 184 is disposed on the folder 146, and an optical system 180 is arranged in the auxiliary housing 142 extending longitudinally from the main housing 140.

Specifically, the display unit includes a holographic screen 184 and the optical system 180. The holographic screen 184 is disposed on the folder 146, and the optical system 180 is received in the auxiliary housing 142. The optical system 180 projects image-light on the holographic screen 184 when the folder 146 is completely opened while being inclined at a predetermined angle.

More specifically, the optical system 180 includes an optic source 181, a microdisplay LCD 182, and an optical projection element 183. The optic source 181 is received in the auxiliary housing 142. The microdisplay LCD 182 is spaced apart from and above the optic source 181, and receives light emitted from the optic source 181 and emits image-light by means of the received light. The optical projection element 183 is disposed above the microdisplay LCD 182, that is, at a predetermined portion of the upper surface of the auxiliary housing 142, and causes the image-light, which is incident from the microdisplay LCD 182, to diverge toward the holographic screen 184. It is preferred that the optic source 181 is a light-emitting diode, more preferably one selected from white, red, or blue light-emitting diodes. It is also preferred that the microdisplay LCD 182 is a projection LCD since the optic source 181 is disposed under the microdisplay LCD 182, and the optical projection element 183 is a divergence lens. Further, it is preferred that the holographic screen 184 is a holographic projection screen, since the image-light having passed through the divergence lens 193 is shed on the rear surface of the holographic screen 184.

Additionally, a light-diverging medium 185 is opposed to the folder 146, specifically, with the holographic screen 184. The light-diverging medium 185 is a medium having a refractivity different from that of the holographic screen 184, so that the light-diverging medium 185 causes the image-light, which is incident from the holographic screen 184, to diverge, thereby enabling a user to view clearer images.

Figure 10:
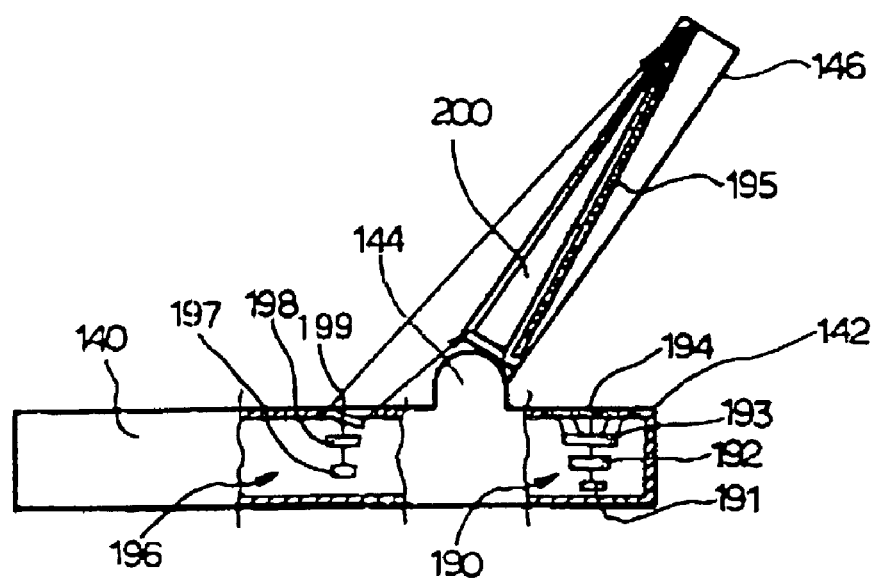
FIG. 10 is a partly cut-out side view of a portable terminal device employing a display unit according to the seventh preferred embodiment of the present invention.

FIG. 10 is a partly cut-out side view of a folder type portable terminal device employing a display unit according to the seventh embodiment of the present invention. As shown in FIG. 10, the portable terminal device employing a display unit according to the seventh embodiment of the present invention includes a main housing 140, an auxiliary housing 142 formed integrally with and extending longitudinally from the main housing 140, a hinge means 144 protruding upward and disposed between the main housing 140 and the auxiliary housing 142, and a folder 146 connected with the hinge means 144 so that the folder 146 can be rotated to open or close the front surface of the main housing 140. In this case, the display unit according to the seventh embodiment of the present invention includes first and second display sub-units. The first display sub-unit displays information when the folder 146 is closed, while the second display sub-unit displays information when the folder 146 is open.

The first display sub-unit includes a first holographic screen 194 disposed on the upper surface of the auxiliary housing 142, and a first optical system 190 received in the auxiliary housing 142 and disposed under the first holographic screen 194. The first holographic screen 194 is disposed at a predetermined portion on the upper surface 142a of the auxiliary housing 142 while being exposed to the exterior. The first optical system 190 is disposed under and spaced apart from the first holographic screen 194, and projects image-light on the first holographic screen 194.

Specifically, the first optical system 190 includes a first optic source 191, a first microdisplay LCD 192, and a first optical projection element 193. The first optic source 191 is disposed under the first holographic screen 194. The first microdisplay LCD 192 is disposed above and spaced apart from the first optic source 191, and receives light emitted from the first optic source 191 and emits image-light by means of the received light. The first optical projection element 193 is arranged between the first holographic screen 194 and the first microdisplay LCD 192, and causes the image-light, which is incident from the first microdisplay LCD 192, to diverge toward the first holographic screen 194. It is preferred that the first optic source 191 is a light-emitting diode, more preferably one selected from white, red, or blue light-emitting diodes. It is also preferred that the first microdisplay LCD 192 is a projection LCD since the first optic source 191 is disposed under the first microdisplay LCD 192, and that the first optical projection element 193 is a divergence lens. Further, it is preferred that the first holographic screen 194 is a holographic projection screen, since the image-light having passed through the first divergence lens 193 is shed on the rear surface of the first holographic screen 194.

The second display sub-unit includes a second holographic screen 195 disposed on the folder 146, and a second optical system 196 disposed in the main housing 140, which projects image-light on the second holographic screen 195. When the folder 146 is opened, the second display sub-unit provides the second holographic screen 195 with the image-light, thereby enabling a user to see information on the second holographic screen 195. The second optical system 196 includes a second optic source 197, a second microdisplay LCD 198, and a second optical projection element 199. The second optic source 197 is received in the main housing 140. The second microdisplay LCD 198 is disposed above and spaced apart from the second optic source 197, and receives light emitted from the second optic source 197 and emits image-light by means of the received light. The second optical projection element 199 is disposed while being inclined at a predetermined upper portion of the main housing 142, and causes the image-light, which is projected from the second microdisplay LCD 198, to diverge toward the second holographic screen 195. It is preferred that the second optic source 197 is a light-emitting diode, more preferably one selected from white, red, or blue light-emitting diodes. It is also preferred that the second microdisplay LCD 198 is a projection LCD since the second optic source 197 is disposed under the second microdisplay LCD 198, and that the second optical projection element 199 is a divergence lens. Further, it is preferred that the second holographic screen 195 is a holographic reflection screen, since the image-light having passed through the second divergence lens 199 is shed on the front surface of the second holographic screen 195.

Additionally, a light-diverging medium 200 is opposed to the folder 146, specifically, with the second holographic screen 195. The light-diverging medium 200 is a medium having a refractivity different from that of the second holographic screen 195, so that the light-diverging medium 200 causes the image-light, which is incident from the second holographic screen 195, to diverge, thereby enabling a user to view clearer images.

Figure 11:
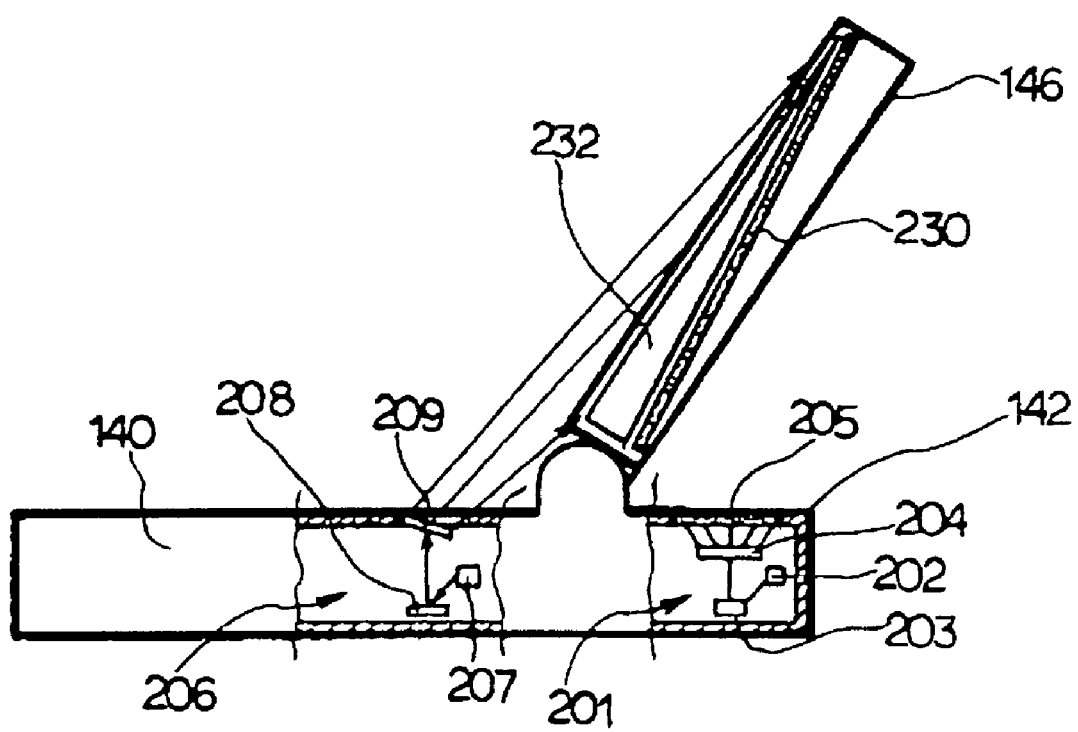
FIG. 11 is a partly cut-out side view of a portable terminal device employing a display unit according to the eighth preferred embodiment of the present invention.

FIG. 11 is a partly cut-out side view of a folder type portable terminal device employing a display unit according to the eighth embodiment of the present invention. As shown in FIG. 11, the portable terminal device employing a display unit according to the eighth embodiment of the present invention includes a main housing 140, an auxiliary housing 142 formed integrally with and extending longitudinally from the main housing 140, a hinge means 144 protruding upward and disposed between the main housing 140 and the auxiliary housing 142, and a folder 146 connected with the hinge means 144 so that the folder 146 can be rotated to open or close the front surface of the main housing 140. In this case, the display unit according to the eighth embodiment of the present invention includes first and second display sub-units. The first display sub-unit displays information when the folder 146 is closed, while the second display sub-unit displays information when the folder 146 is open.

The first display sub-unit includes a first holographic screen 205 disposed on the upper surface of the auxiliary housing 142, and a first optical system 201 received in the auxiliary housing 142 and disposed under the first holographic screen 205. The first holographic screen 205 is disposed at a predetermined portion on the upper surface 142a of the auxiliary housing 142 while being exposed to the exterior. The first optical system 201 is disposed under and spaced apart from the first holographic screen 205, and projects image-light on the first holographic screen 205.

Specifically, the first optical system 201 includes a first optic source 202, a first microdisplay LCD 203, and a first optical projection element 204. The first optic source 202 is disposed under and near the first holographic screen 205. The first microdisplay LCD 203 is disposed near and spaced apart from the first optic source 202, and receives light emitted from the first optic source 202 and emits image-light by means of the received light. The first optical projection element 204 is arranged between the first holographic screen 205 and the first microdisplay LCD 203, and causes the image-light, which is incident from the first microdisplay LCD 203, to diverge toward the first holographic screen 205. It is preferred that the first optic source 202 is a light-emitting diode, more preferably one selected from white, red, or blue light-emitting diodes. It is also preferred that the first microdisplay LCD 203 is a reflection LCD since the first optic source 202 is disposed above the first microdisplay LCD 203, and that the first optical projection element 204 is a divergence lens. Further, it is preferred that the first holographic screen 205 is a holographic projection screen, since the image-light having passed through the first divergence lens 204 is shed on the rear surface of the first holographic screen 205.

The second display sub-unit includes a second holographic screen 230 disposed on the folder 146, and a second optical system 206 disposed in the main housing 140, which projects image-light on the second holographic screen 230. The second display sub-unit provides the second holographic screen 230 with the image-light, thereby enabling a user to see information on the second holographic screen 230, when the folder 146 is opened. The second optical system 206 includes a second optic source 207, a second microdisplay LCD 208, and a second optical projection element 209. The second optic source 207 is received in the main housing 140. The second microdisplay LCD 208 is disposed spaced apart from the second optic source 207, and receives light emitted from the second optic source 207 and emits image-light by means of the received light. The second optical projection element 209 is disposed while being inclined at a predetermined upper portion of the main housing 142, and causes the image-light, which is incident from the second microdisplay LCD 208, to diverge toward the second holographic screen 230. It is preferred that the second optic source 207 is a light-emitting diode, more preferably one selected from white, red, or blue light-emitting diodes. It is also preferred that the second microdisplay LCD 208 is a reflection LCD since the second optic source 207 is disposed above the second microdisplay LCD 208, and that the second optical projection element 209 is a divergence lens. Further, it is preferred that the second holographic screen 230 is a holographic reflection screen, since the image-light having passed through the divergence lens 209 is shed on the front surface of the second holographic screen 230.

Additionally, a light-diverging medium 232 is opposed to the folder 146, specifically, with the second holographic screen 230. The light-diverging medium 232 is a medium having a refractivity different from that of the second holographic screen 230, so that the light-diverging medium 232 causes the image-light, which is incident from the second holographic screen 230, to diverge, thereby enabling a user to view clearer images.

Figure 12:
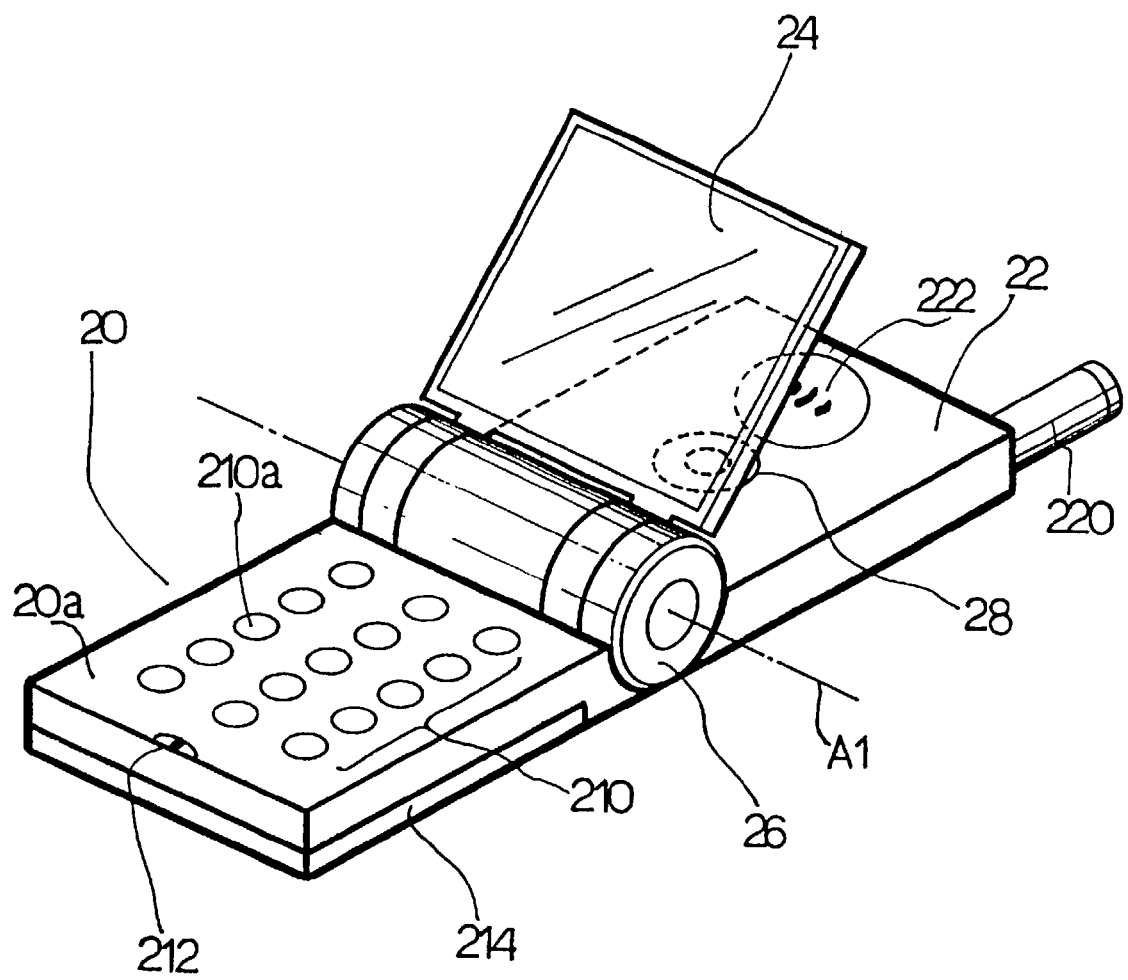
FIG. 12 is a perspective view of a portable terminal device employing a display unit according to the ninth preferred embodiment of the present invention.
Figure 13:
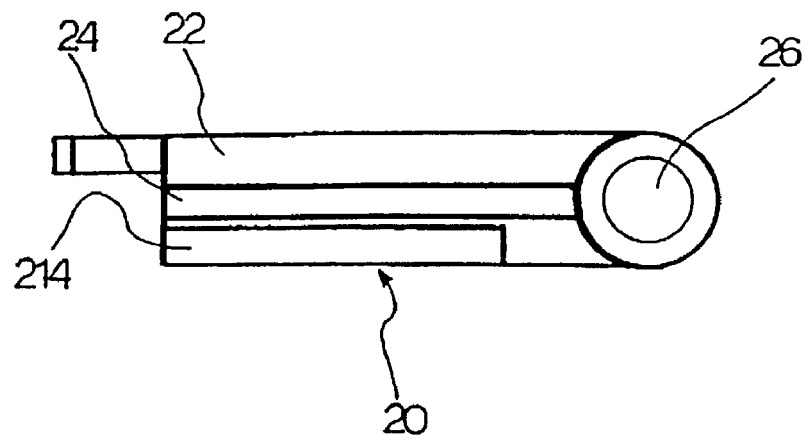
FIG. 13 is a side view of a portable terminal device shown in FIG. 12.
Figure 14:
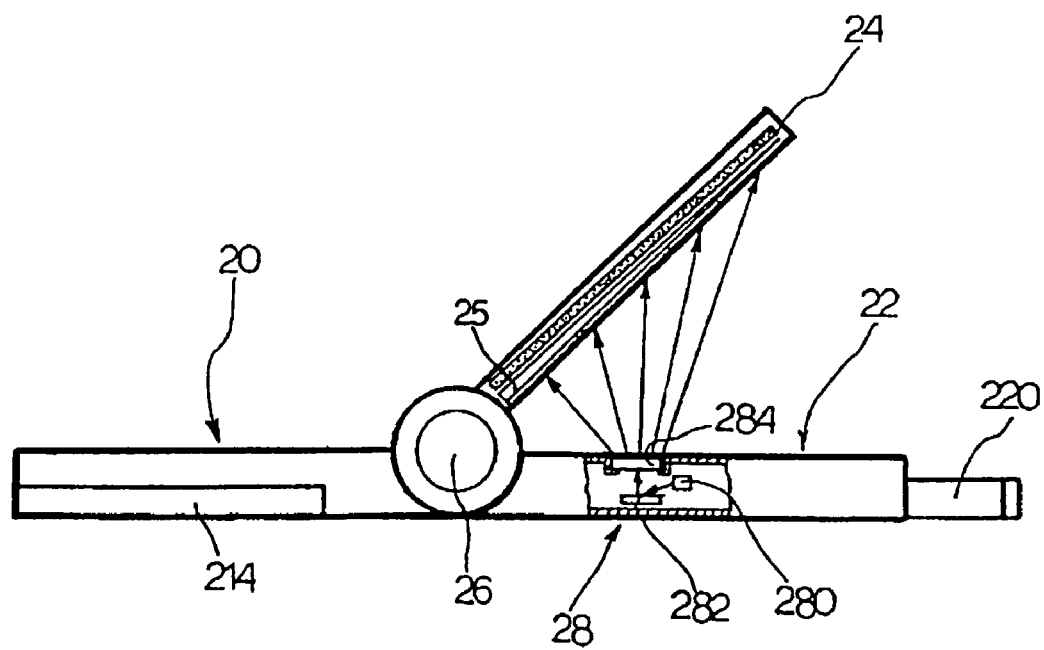
FIG. 14 is a partly cut-out side view of a portable terminal device shown in FIG. 12, which shows the construction of an optical system employed therein.

FIGS. 12 to 14 show another portable terminal device employing a display unit according to the ninth embodiment of the present invention. As shown in FIGS. 12 to 14, the portable terminal device employing a display unit according to the ninth embodiment of the present invention includes a main housing 20, an auxiliary housing 22 rotatably assembled with one end of the main housing 20 by means of a hinge means 26 disposed between the main housing 20 and the auxiliary housing 22, a holographic screen 24 rotatably assembled between the main housing 20 and the auxiliary housing 22 by means of the hinge means 26, and an optical system 28 for providing the holographic screen 24 with holographic image-light. The main housing 20, the auxiliary housing 22, and the holographic screen 24 are rotatably connected with each other by means of one hinge means 26, and either the auxiliary housing 22 or the holographic screen 24 can be rotated to open or cover over the front surface of the main housing 20. Further, only after the auxiliary housing 22 is rotated to open the front surface of the main housing 20, the holographic screen 24 can be rotated from the main housing 20. The holographic screen 24 further includes a light-diverging medium 25 opposed to the holographic screen 24. The light-diverging medium 25 causes the image-light, which is incident from the holographic screen 24, to diverge, thereby enabling a user to view clearer images.

The main housing 20 includes a keypad 210 having a plurality of keys 210a arranged thereon, a microphone 212, and a battery pack 214. The auxiliary housing 22 includes an antenna 220, a speaker 222, and an optical system 28. When the holographic screen 24 is completely opened while being inclined at a predetermined angle with respect to the main housing 20, the optical system 28 projects image-light on the rear surface of the holographic screen 24, thereby enabling a user to view holographic image displayed by the holographic screen 24. When the holographic screen 24 is completely opened, the rear surface of the holographic screen 24 is disposed at its nearest position to the optical system 28.

Specifically, the optical system 28 includes an optic source 280, a microdisplay LCD 282, and an optical projection element 284. The optic source 280 is received in the auxiliary housing 22. The microdisplay LCD 282 is spaced apart from the optic source 280, and receives light emitted from the optic source 280 and emits image-light by means of the received light. The optical projection element 284 is disposed at a predetermined portion of the upper surface of the auxiliary housing 22, and causes the image-light, which is reflected from the microdisplay LCD 282, to diverge toward the holographic screen 24. It is preferred that the optic source 280 is a light-emitting diode, more preferably one selected from white, red, or blue light-emitting diodes. It is also preferred that the microdisplay LCD 282 is a reflection LCD, and the optical projection element 284 is a divergence lens.

The keypad 210 includes a plurality of keys 210a arranged thereon, preferably keys 210a which can be touched to input data by fingers. The keys 210a may include number keys, letter keys, function keys, a communication key, a deletion key and so on. Further, the microphone 212 is disposed under the keypad 210, and a battery pack 214 for supplying electric power is assembled with the main housing 20.

According to the construction described above, after the holographic screen 24 is completely opened from the main housing 20 as shown in FIG. 14, when light is emitted from the optic source 280 toward the microdisplay LCD 282, the emitted light is reflected and converted to image-light by the microdisplay LCD 282, and then the image-light is transmitted toward the optical projection element 284 from the microdisplay LCD 282. Thereafter, the image-light diverges while passing through the optical projection element 284, and then is shed on the rear surface of the holographic screen 24. Then, the holographic screen 24 forms holographic images at a portion spaced a predetermined distance behind the holographic screen 24. As a result, a user can view the holographic images displayed by the holographic screen in a comfortable posture.

Figure 15:
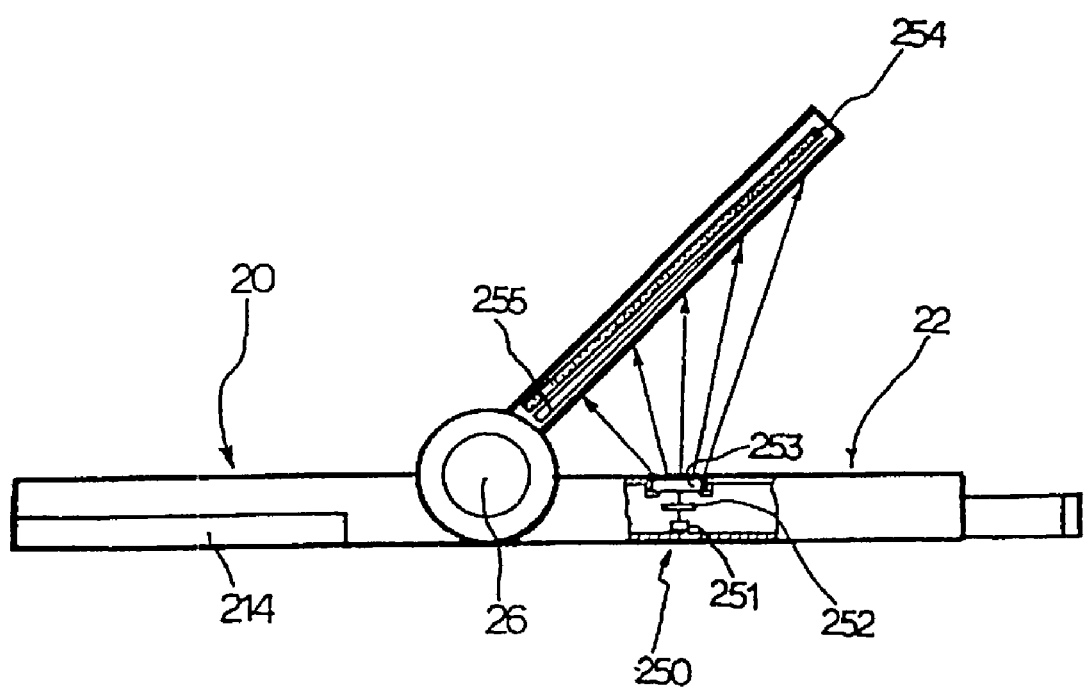
FIG. 15 is a partly cut-out side view of a portable terminal device employing a display unit according to the tenth preferred embodiment of the present invention.

FIG. 15 is a partly cut-out sectional view of a portable terminal device employing a display unit according to the tenth embodiment of the present invention. As shown in FIG. 15, the portable terminal device includes a main housing 20, an auxiliary housing 22 rotatably assembled with one end of the main housing 20 by means of a hinge means 26 disposed between the main housing 20 and the auxiliary housing 22, a hologram screen 254 rotatably assembled between the main housing 20 and the auxiliary housing 22 by means of the hinge means 26, and an optical system 250 for providing the holographic screen 254 with holographic image-light. The main housing 20, the auxiliary housing 22, and the holographic screen 254 are rotatably connected with each other by means of one hinge means 26, and either the auxiliary housing 22 or the holographic screen 254 can be rotated to open or cover over the front surface of the main housing 20. Further, only after the auxiliary housing 22 is rotated to open the front surface of the main housing 20, the holographic screen 254 can be rotated from the main housing 20. The holographic screen 254 may further include a light-refracting medium 255 opposed to the holographic screen 254.

When the holographic screen 254 is completely opened while being inclined at a predetermined angle with respect to the main housing 20, the optical system 250 projects image-light on the rear surface of the holographic screen 254, thereby enabling a user to view holographic image displayed by the holographic screen 254. When the holographic screen 254 is completely opened, the rear surface of the holographic screen 254 is disposed at its nearest position to the optical system 250.

Specifically, the optical system 250 includes an optic source 251, a microdisplay LCD 252, and an optical projection element 253. The optic source 251 is received in the auxiliary housing 22. The microdisplay LCD 252 is spaced apart from the optic source 251, and receives light emitted from the optic source 251 and emits image-light by means of the received light. The optical projection element 253 is disposed at a predetermined portion of the upper surface of the auxiliary housing 22, and causes the image-light, which is incident from the microdisplay LCD 252, to diverge toward the holographic screen 254. It is preferred that the optic source 251 is a light-emitting diode, more preferably one selected from white, red, or blue light-emitting diodes. It is also preferred that the microdisplay LCD 252 is a projection LCD, and that the optical projection element 253 is a divergence lens. Further, it is preferred that the first holographic screen 254 is a holographic projection screen, since the image-light having passed through the first divergence lens 253 is shed on the rear surface of the first holographic screen 254.

According to the construction described above, after the holographic screen 254 is completely opened from the main housing 20 as shown in FIG. 15, when light is emitted from the optic source 251 toward the microdisplay LCD 252, the emitted light is transmitted through and converted to image-light by the microdisplay LCD 252, and then the image-light is transmitted toward the optical projection element 253 from the microdisplay LCD 252. Thereafter, the image-light diverges while passing through the optical projection element 253, and then is shed on the rear surface of the holographic screen 254. Then, the holographic screen 254 forms holographic images at a portion spaced a predetermined distance behind the holographic screen 254. As a result, a user can view the holographic images displayed by the holographic screen 254 in a comfortable posture.

Figure 16:
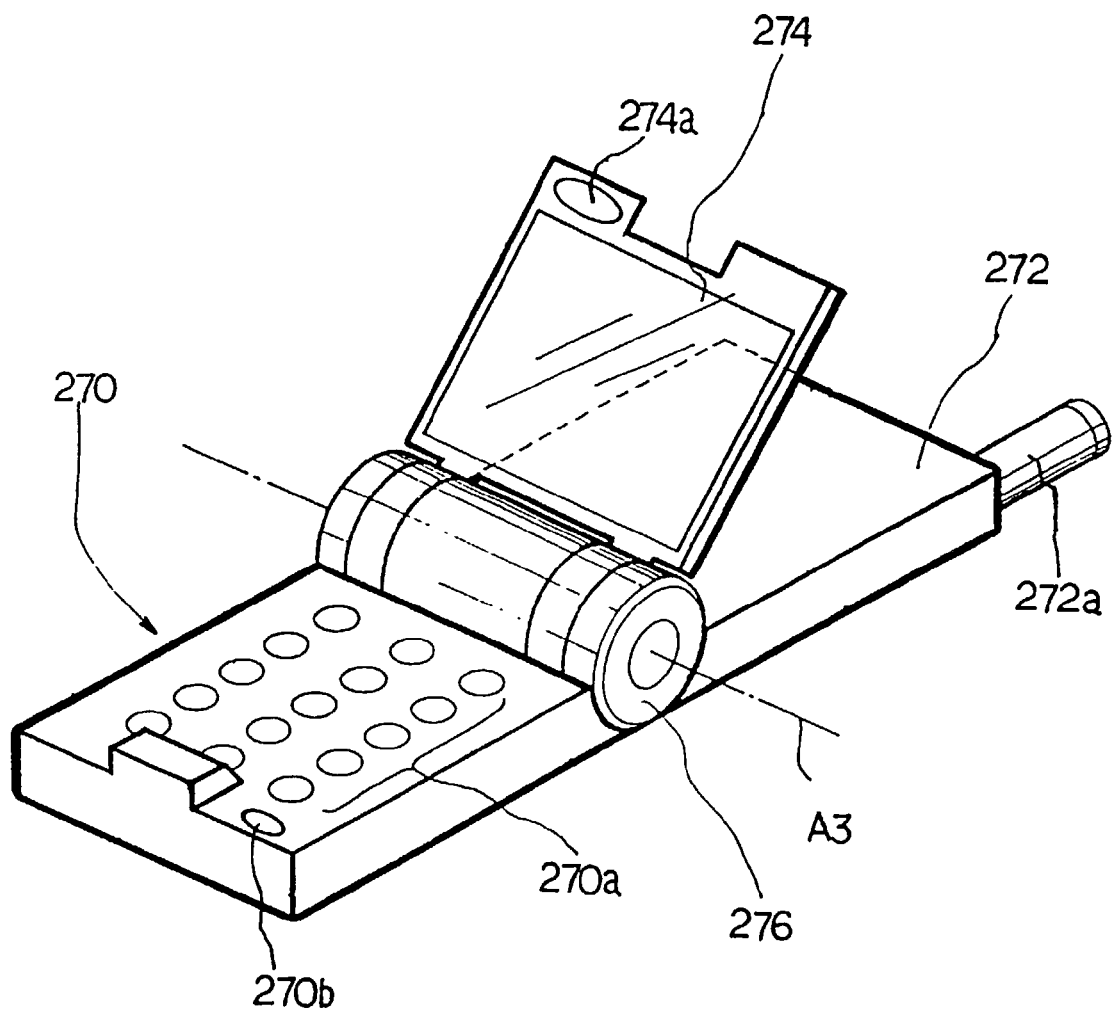
FIG. 16 is a perspective view of a portable terminal device employing a display unit according to the eleventh preferred embodiment of the present invention.
Figure 17:
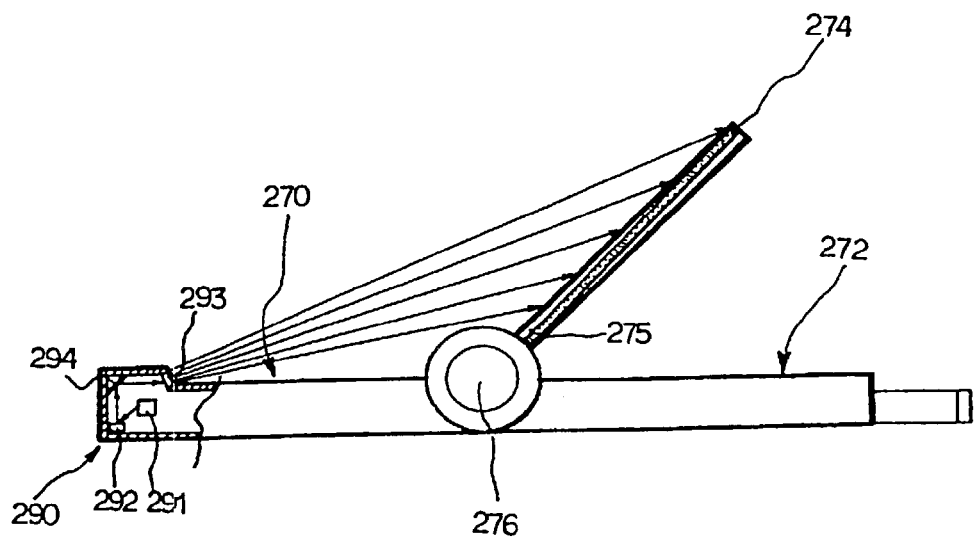
FIG. 17 is a partly cut-out side view of a portable terminal device shown in FIG. 16, which shows the construction of an optical system employed therein.

FIGS. 16 and 17 are perspective and partly cut-out side views of a portable terminal device employing a display unit according to the eleventh embodiment of the present invention. As shown in FIGS. 16 and 17, the portable terminal device includes a main housing 270, an auxiliary housing 272, a hologram screen 274 disposed between the main housing 270 and the auxiliary housing 272, and an optical system 290 for providing the holographic screen 274 with holographic image-light. The main housing 270, the auxiliary housing 272, and the holographic screen 274 are rotatably connected with each other by means of one hinge means 276, and the holographic screen 274 is opposed to a light-refracting medium 275.

The main housing 270 includes a keypad 270a having a plurality of keys arranged thereon, a microphone 270b, and an optical system 290. The holographic screen 274 includes a speaker 274a, and the auxiliary housing 272 includes an antenna 272a and is assembled with a battery pack 214. In this case, the holographic screen 274 may further include a light-diverging medium 275.

The optical system 290 is disposed at a predetermined portion of the main housing 270, and may be disposed at any position which enables the optical system 290 to shed the image-light on the holographic screen 274 when the holographic screen 274 is opened.

The optical system 290 includes an optic source 291, a microdisplay LCD 292, and a divergence lens 293. The microdisplay LCD 292 receives light emitted from the optic source 291 and emits image-light by means of the received light. The divergence lens 293 causes the image-light, which is provided by the microdisplay LCD 292, to diverge toward the holographic screen 274. The microdisplay LCD 292 is a reflection LCD since the optic source 291 is disposed above the microdisplay LCD 292. It is preferred that the holographic screen 274 is a holographic reflection screen, since the image-light having passed through the first divergence lens 253 is shed on the front surface of the first holographic screen. Further, a mirror 294 is disposed between the microdisplay LCD 292 and the divergence lens 293.

It is preferred that the optic source 291 is a light-emitting diode, more preferably one selected from white, red, or blue light-emitting diodes.

Figure 18:
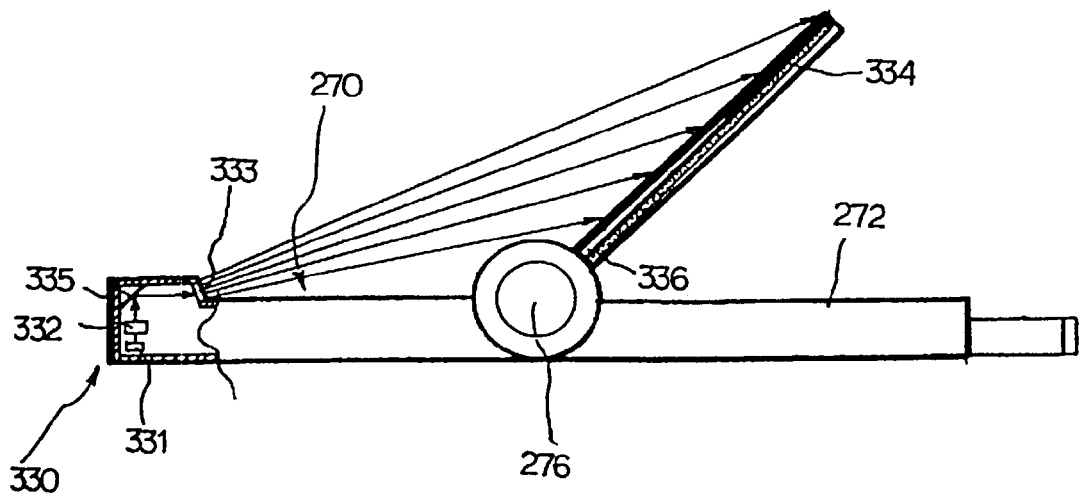
FIG. 18 is a partly cut-out side view of a portable terminal device employing a display unit according to the twelfth preferred embodiment of the present invention.

FIG. 18 is a partly cut-out side view of a portable terminal device employing a display unit according to the twelfth embodiment of the present invention. As shown in FIG. 18, the portable terminal device includes a main housing 270, an auxiliary housing 272 rotatably assembled with the main housing 270 by means of a hinge means 270, a hologram screen 334 disposed between the main housing 270 and the auxiliary housing 272, which can be rotated about and opened or closed by the hinge means 276. The main housing 270, the auxiliary housing 272, and the holographic screen 334 are rotatably connected with each other by means of the hinge means 276, and the holographic screen 334 is opposed to a light-refracting medium 336. The holographic screen 334 includes a light-refracting medium 336.

The display unit according to the present embodiment includes a holographic screen 334, and an optical system 330 for providing the holographic screen 334 with image-light. The optical system 330 is disposed at a predetermined portion of the main housing 270. The optical system 330 includes an optic source 331, a microdisplay LCD 332, and a divergence lens 333. The microdisplay LCD 332 receives light emitted from the optic source 331 and emits image-light by means of the received light. The divergence lens 333 causes the image-light, which is provided by the microdisplay LCD 332, to diverge toward the holographic screen 334. Further, a mirror 335 is disposed between the microdisplay LCD 332 and the divergence lens 333. It is preferred that the optic source 331 is a light-emitting diode, more preferably one selected from white, red, or blue light-emitting diodes. The holographic screen 334 is a holographic reflection screen, since the image-light having passed through the first divergence lens 333 is shed on the front surface of the first holographic screen. Also, the microdisplay LCD 332 is a projection LCD since the optic source 331 is disposed directly under the microdisplay LCD 332.

Figure 19:
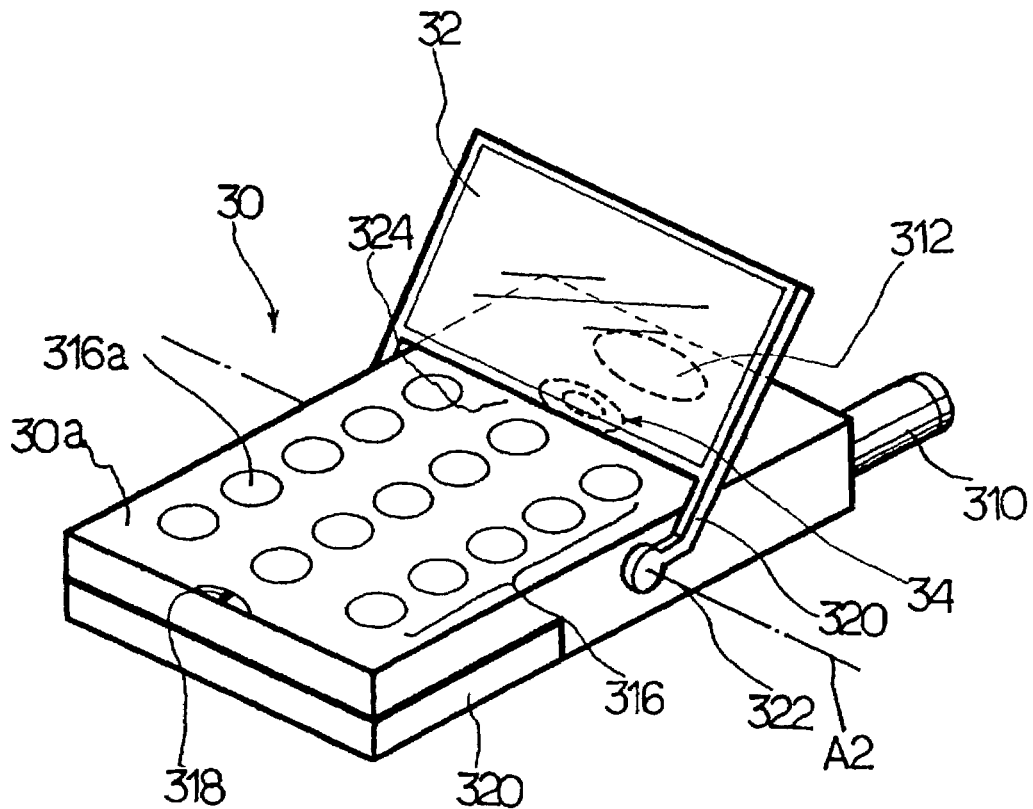
FIG. 19 is a perspective view of a portable terminal device employing a display unit according to the thirteenth preferred embodiment of the present invention.
Figure 20:
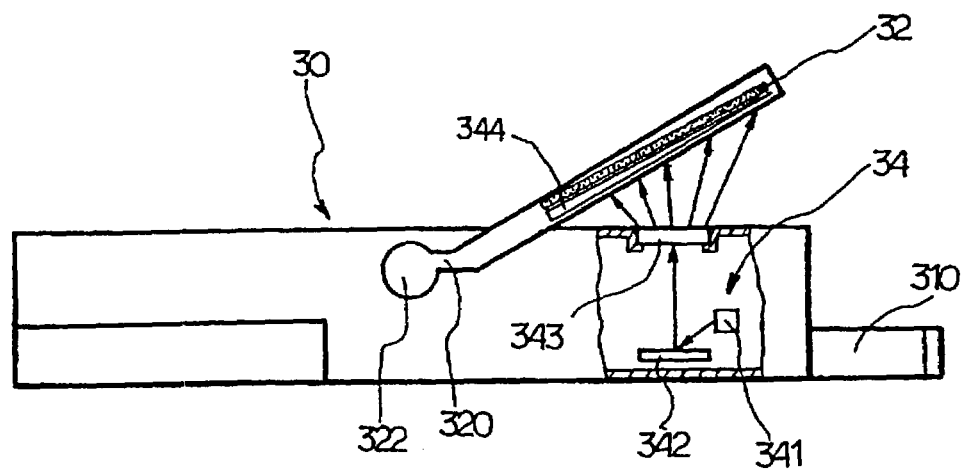
FIG. 20 is a partly cut-out side view of a portable terminal device shown in FIG. 19, which shows the construction of an optical system employed therein.

FIGS. 19 and 20 show a flip-up type portable terminal device employing a display unit according to the thirteenth embodiment of the present invention. The flip-up type portable terminal device shown in FIGS. 19 and 20 includes a main housing 30, a holographic screen 32 rotatably assembled with and opened from or closed onto the main housing 30, and an optical system 34 for providing the holographic screen 32 with image-light. The holographic screen 32 includes a light-refracting medium 344 opposed to the holographic screen 32.

The holographic screen 32 protects a plurality of keys 316a when the holographic screen 32 is closed on the main housing 30, while performing display function when it is completely opened from the main housing 30 while being inclined at a predetermined angle between about 130° and 150°. The holographic screen 32 includes connecting arms 320 formed integrally with and extending from opposite lower edges of the holographic screen 32, and hinge arms formed integrally with and extending from the connecting arms 320. The holographic screen 32 and connecting arms 320 defines an opening 324 between the main housing. The connecting arms 320 and hinge arms 322 enable the holographic screen 32 to be assembled with the main housing while being rotatable about the hinge axis A2.

A speaker 312 and an optical system 34 are disposed at one section of the main housing 30, while a keypad 316 and a microphone 318 are arranged on an upper surface of another section of the main housing 30.

As already described, the optical system 34 is disposed at a location which is advantageous in enabling the optical system 34 to shed the image-light on the rear surface of holographic screen 32 when the holographic screen 32 has been completely opened. That is, it is preferred that the optical system 34 is disposed between the speaker 312 and the keypad 316. The optical system 34 includes an optic source 341, a microdisplay LCD 342, and an optical projection element 343. The microdisplay LCD 342 is spaced apart from the optic source 341, and receives light emitted from the optic source 341 and emits image-light by means of the received light. The optical projection element 343 is disposed between the holographic screen 32 and the microdisplay LCD 342, and causes the image-light, which is reflected from the microdisplay LCD 342, to diverge toward the holographic screen 32. It is preferred that the optic source 341 is a light-emitting diode, more preferably one selected from white, red, or blue light-emitting diodes. It is also preferred that the microdisplay LCD 342 is a reflection LCD, and the optical projection element 343 is a divergence lens. Further, the holographic screen 32 is preferably a holographic projection screen, since the image-light is shed on the rear surface of the holographic screen 32.

The keypad 316 includes a plurality of keys 316a arranged thereon, preferably keys 316a which can be touched to input data by fingers. The keys 316a may include number keys, letter keys, function keys, a communication key, a deletion key and so on. Further, a battery pack 320 for supplying electric power is assembled with the main housing 30.

According to the construction described above, after the holographic screen 32 is completely opened from the main housing 30, when light is emitted from the optic source 341 toward the microdisplay LCD 342, the emitted light is reflected and converted to image-light by the microdisplay LCD 342, and then the image-light is transmitted toward the optical projection element 343 from the microdisplay LCD 342. Thereafter, the image-light diverges while passing through the optical projection element 343, and then is shed on the rear surface of the holographic screen 32. Then, the holographic screen 32 forms holographic images at a portion spaced a predetermined distance behind the holographic screen 32. As a result, a user can view the holographic images displayed by the holographic screen 32 in a comfortable posture.

Figure 21:
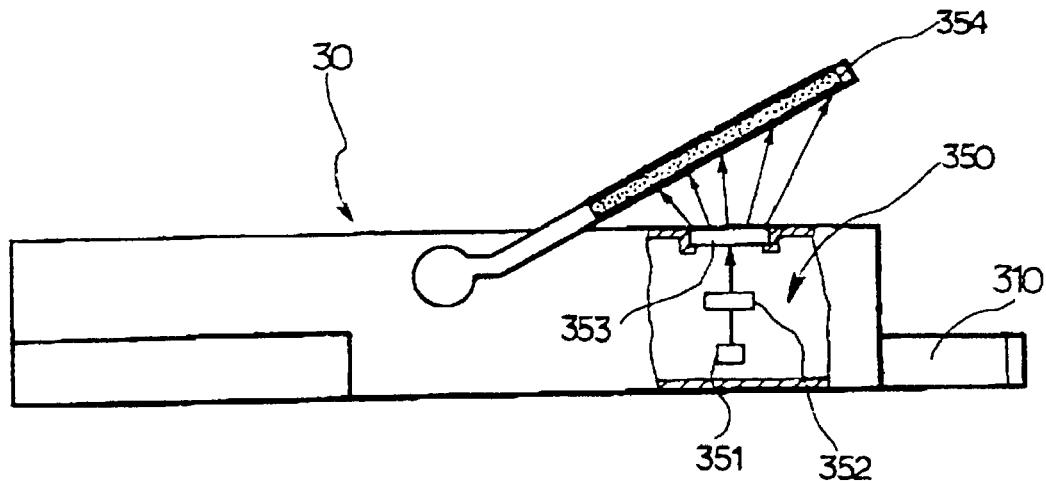
FIG. 21 is a partly cut-out side view of a portable terminal device employing a display unit according to the fourteenth preferred embodiment of the present invention.

FIG. 21 is a partly cut-out side view of a portable terminal device employing a display unit according to the fourteenth embodiment of the present invention. As shown in FIG. 21, the portable terminal device includes a main housing 30, a holographic screen 354 rotatably assembled with and opened from or closed onto the main housing 30, and an optical system 350 for providing the holographic screen 354 with image-light. The holographic screen 354 includes a light-refracting medium 355 opposed to the holographic screen 354. The holographic screen 354 is completely opened from the main housing 30 when it is inclined at a predetermined angle between about 130° and 150°.

As already described, the optical system 350 is disposed at a location which is advantageous in enabling the optical system 350 to shed the image-light on the rear surface of holographic screen 354 when the holographic screen 354 has been completely opened. The optical system 350 includes an optic source 351, a microdisplay LCD 352, and an optical projection element 353. The microdisplay LCD 352 is spaced apart from the optic source 351, and receives light emitted from the optic source 351 and emits image-light by means of the received light. The optical projection element 353 is disposed between the holographic screen 354 and the microdisplay LCD 352, and causes the image-light, which is reflected from the microdisplay LCD 352, to diverge toward the holographic screen 354. It is preferred that the optic source 351 is a light-emitting diode, more preferably one selected from white, red, or blue light-emitting diodes. It is also preferred that the microdisplay LCD 352 is a projection LCD, and the optical projection element 353 is a divergence lens. Further, the holographic screen 354 is preferably a holographic projection screen, since the image-light is shed on the rear surface of the holographic screen 354.

According to the construction described above, after the holographic screen 354 is completely opened from the main housing 30, when light is emitted from the optic source 351 toward the microdisplay LCD 352, the emitted light passes through and converted to image-light by the microdisplay LCD 352, and then the image-light is transmitted toward the optical projection element 353 from the microdisplay LCD 352. Thereafter, the image-light diverges while passing through the optical projection element 353, and then is shed on the rear surface of the holographic screen 354. Then, the holographic screen 354 forms holographic images at a portion spaced a predetermined distance behind the holographic screen 354. As a result, a user can view the holographic images displayed by the holographic screen 354 in a comfortable posture.

Figure 22:
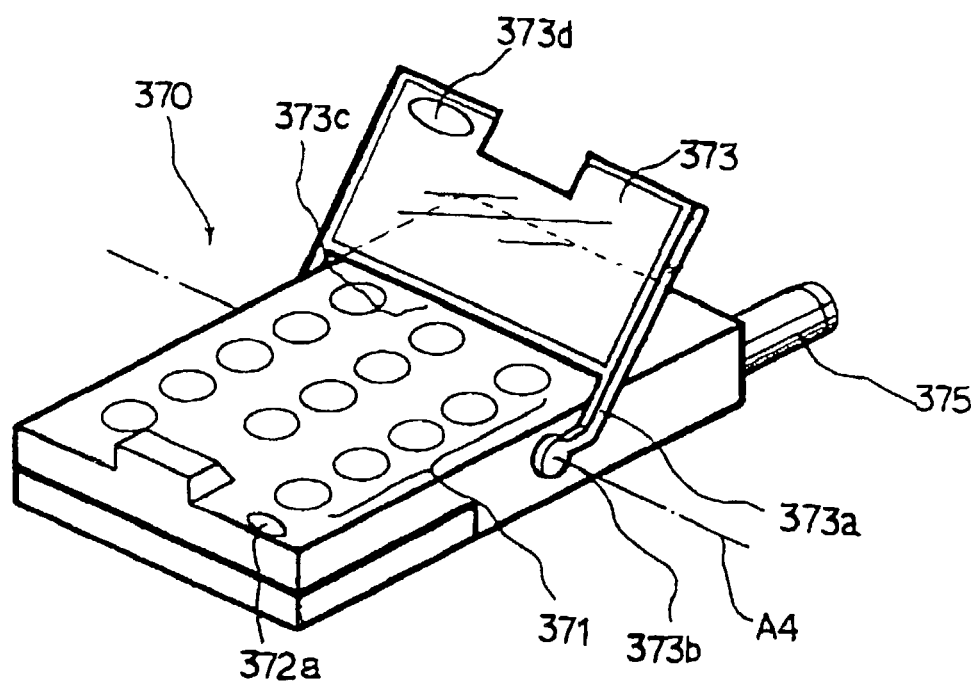
FIG. 22 is a perspective view of a portable terminal device employing a display unit according to the fifteenth preferred embodiment of the present invention.
Figure 23:
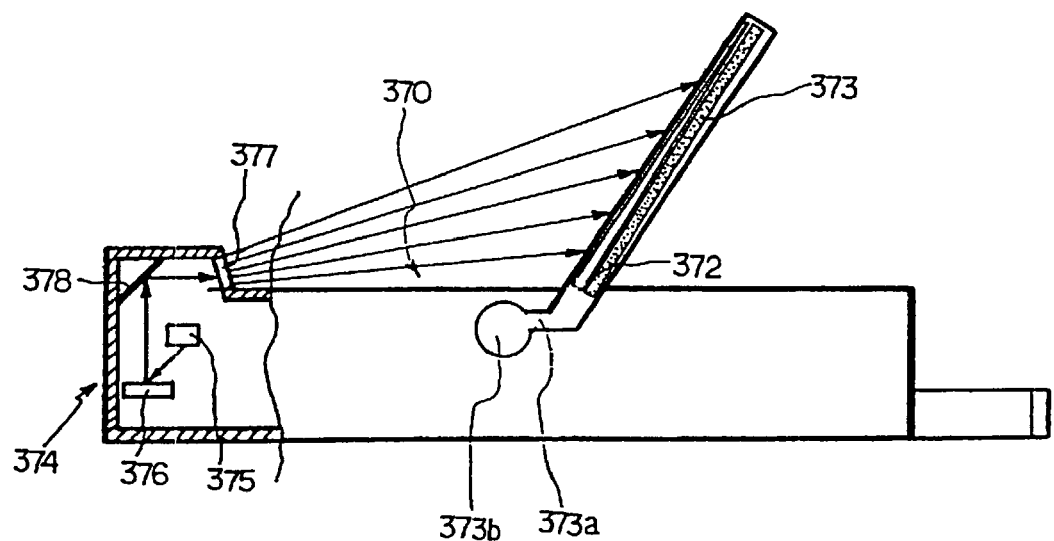
FIG. 23 is a partly cut-out side view of a portable terminal device shown in FIG. 22, which shows the construction of an optical system employed therein.

FIGS. 22 and 23 show a flip-up type portable terminal device employing a display unit according to the fifteenth embodiment of the present invention. The flip-up type portable terminal device shown in FIGS. 22 and 23 includes a main housing 370, a holographic screen 373 rotatably assembled with and opened from or closed onto the main housing 370, and an optical system 374 for providing the holographic screen 373 with image-light. The holographic screen 373 includes a light-refracting medium 372 opposed to the holographic screen 373. The holographic screen 373 protects a plurality of keys 316a when the holographic screen 373 is closed on the main housing 370, while performing display function when it is completely opened from the main housing 370 while being inclined at a predetermined angle between about 130° and 150°. The holographic screen 373 includes connecting arms 373a integrally formed with and extending from opposite lower edges of the holographic screen 373, and hinge arms 373b integrally formed with and extending from the connecting arms 373a. The holographic screen 373 and connecting arms 373a define an opening 373c between the main housing. The connecting arms 373a and hinge arms 373b enable the holographic screen 373 to be assembled with the main housing while being rotatable about the hinge axis A4.

An optical system 374 is disposed at one section of the main housing 370, while a microphone 372a and a keypad 371 having a plurality of keys arranged thereon are disposed on an upper surface of another section of the main housing 370.

As already described, the optical system 374 is disposed at a location which is advantageous in enabling the optical system 374 to shed the image-light on the rear surface of holographic screen 373 when the holographic screen 373 has been completely opened. The optical system 374 includes a speaker 373d. The optical system 374 includes an optic source 375, a microdisplay LCD 376, and an optical projection element 377. The microdisplay LCD 376 is spaced apart from the optic source 375, and receives light emitted from the optic source 375 and emits image-light by means of the received light. The optical projection element 377 is disposed between the holographic screen 373 and the microdisplay LCD 376, and causes the image-light, which is reflected from the microdisplay LCD 376, to diverge toward the holographic screen 373. It is preferred that the optic source 375 is a light-emitting diode, more preferably one selected from white, red, or blue light-emitting diodes. It is also preferred that the microdisplay LCD 376 is a reflection LCD, and the optical projection element 377 is a divergence lens. Further, the holographic screen 373 is preferably a holographic reflection screen, since the image-light is shed on the front surface of the holographic screen 373.

According to the construction described above, after the holographic screen 373 is completely opened from the main housing 370, when light is emitted from the optic source 375 toward the microdisplay LCD 376, the emitted light is reflected and converted to image-light by the microdisplay LCD 376. Thereafter, the image-light transmitted from the microdisplay LCD 376 is reflected again by a mirror 378 and then is transmitted toward the optical projection element 377 from the mirror 378. Thereafter, the image-light diverges while passing through the optical projection element 377, and then is shed on the front surface of the holographic screen 373. As a result, holographic images are formed on the holographic screen 373, and a user can view the holographic images displayed by the holographic screen 373 in a comfortable posture.

Figure 24:
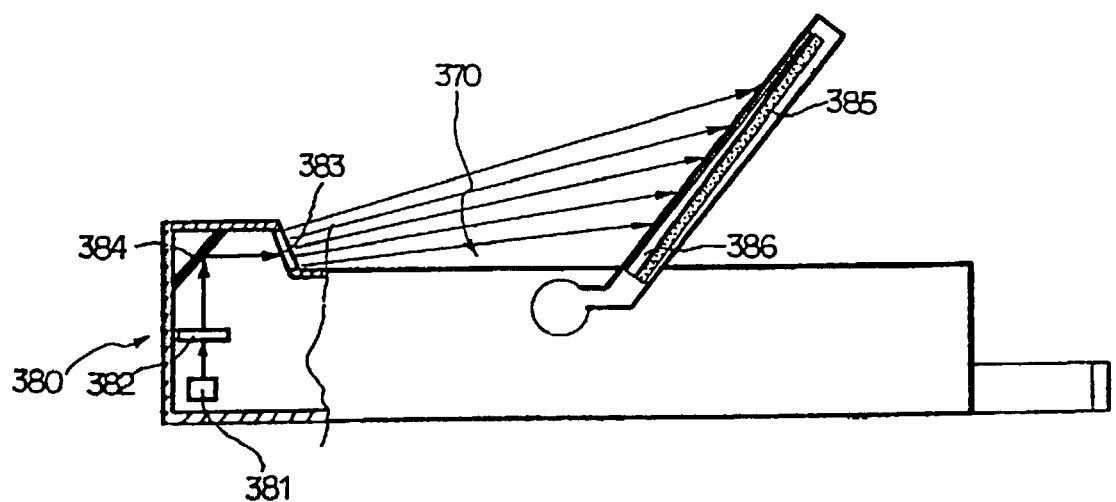
FIG. 24 is a partly cut-out side view of a portable terminal device employing a display unit according to the sixteenth preferred embodiment of the present invention.

FIG. 24 is a partly cut-out side view of a portable terminal device employing a display unit according to the sixteenth embodiment of the present invention. The portable terminal device shown in FIG. 24 includes a main housing 370, a holographic screen 385 opened from or closed on the main housing 370 by means of a hinge means, and an optical system 380 for providing the holographic screen 385 with image-light.

The display unit according to the sixteenth embodiment includes a holographic screen 385, and an optical system 380 for providing the holographic screen 385 with image-light. The optical system 380 is disposed at a predetermined portion of the main housing 370. The optical system 380 includes an optic source 381, a microdisplay LCD 382, and a divergence lens 383. The microdisplay LCD 382 receives light emitted from the optic source 381 and emits image-light by means of the received light. The divergence lens 383 causes the image-light, which is incident from the microdisplay LCD 382, to diverge toward the holographic screen 385. The holographic screen 385 includes a light-refracting medium 386 opposed to the holographic screen 385. Further, a mirror 384 is disposed between the microdisplay LCD 382 and the divergence lens 383. It is preferred that the optic source 381 is a light-emitting diode, more preferably one selected from white, red, or blue light-emitting diodes. The holographic screen 385 is a holographic reflection screen, since the image-light having passed through the first divergence lens 383 is shed on the front surface of the first holographic screen. Also, the microdisplay LCD 382 is a projection LCD since the optic source 381 is disposed directly under the microdisplay LCD 382.

Figure 25:
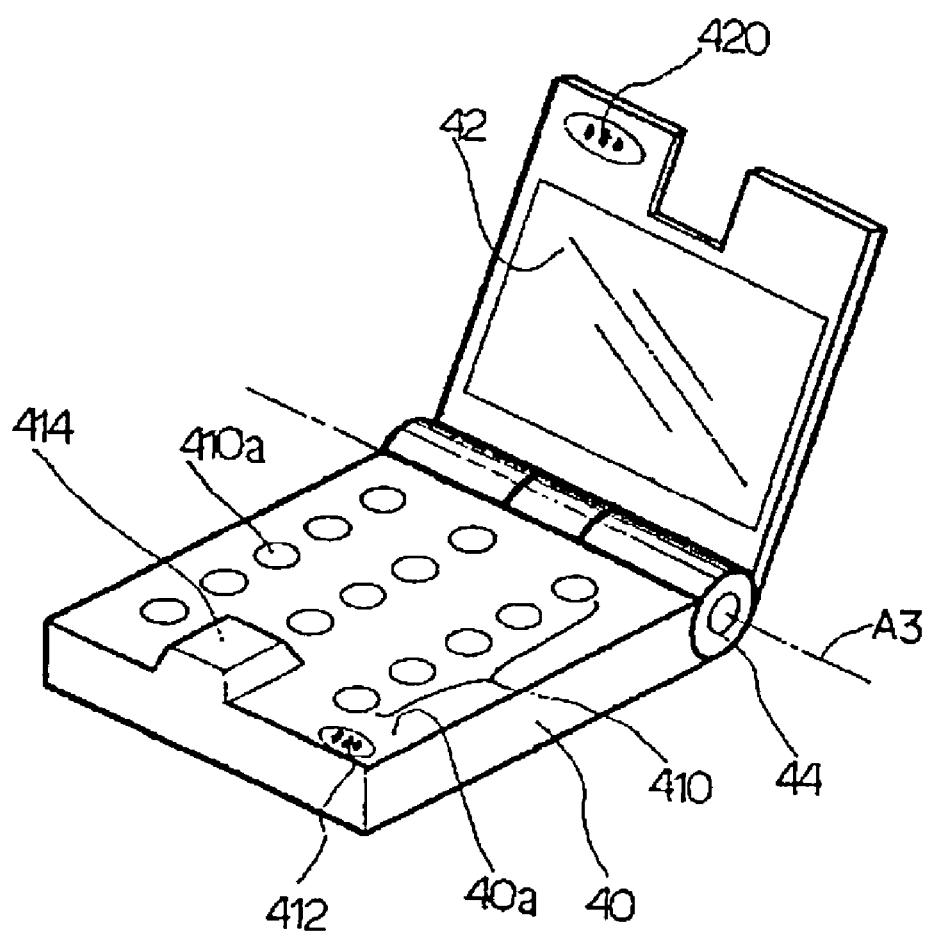
FIG. 25 is a perspective view of a portable terminal device employing a display unit according to the seventeenth preferred embodiment of the present invention.
Figure 26:
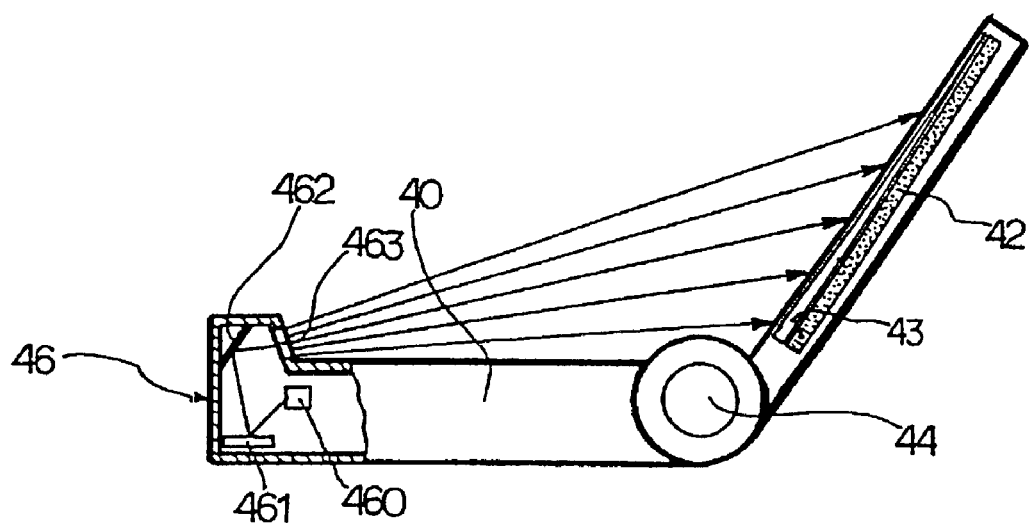
FIG. 26 is a partly cut-out side view of a portable terminal device shown in FIG. 25, which shows the construction of an optical system employed therein.

Referring to FIGS. 25 and 26, a portable terminal device employing a display unit according to the seventeenth embodiment of the present invention includes a main housing 40, a hologram screen 42, a hinge means 44 for rotatably assembling the main housing 40 and the hologram screen 42 with each other, and an optical system 46 for providing the holographic screen 42 with holographic image-light. The holographic screen 42 is rotated about the hinge means 44 to open or cover the main housing 40, and the holographic screen 42 is opposed to a light-refracting medium 43.

The main housing 40 includes a keypad 410 having a plurality of keys 410a arranged thereon, a microphone 412, and the optical system 46. The holographic screen 42 includes a speaker 420. The main housing 40 has a protruding portion 414 formed at a front end portion of an upper surface 40a of the main housing 40, for combining elements of the optical system 46. However, the optical system 46 may be disposed at any position which enables the optical system 46 to shed the image-light on the holographic screen 42 when the holographic screen 42 is opened. It is preferred that the holographic screen 42 is a holographic reflection screen, since the image-light projected from the optic system 46 is shed on the front surface of the holographic screen 42.

The optical system 46 is disposed at a location which is advantageous in enabling the optical system 46 to shed the image-light on the front surface of holographic screen 42 when the holographic screen 42 has been completely opened. That is, it is preferred that the optical system 46 is disposed in front of the main housing 40. The optical system 46 includes an optic source 460, a microdisplay LCD 461, a mirror 462, and an optical projection element 463. The microdisplay LCD 461 is spaced apart from the optic source 460, and receives light emitted from the optic source 460 and emits image-light by means of the received light. The mirror 462 reflects the image-light, which is reflected from the microdisplay LCD 461, at a predetermined angle. The optical projection element 463 causes the image-light, which is reflected from the mirror 462, to diverge toward the holographic screen 42. It is preferred that the optic source 460 is a light-emitting diode, more preferably one selected from white, red, or blue light-emitting diodes. It is also preferred that the microdisplay LCD 461 is a reflection LCD, and the optical projection element 463 is a divergence lens. Further, the holographic screen 42 is preferably a holographic reflection screen, since the image-light is shed on the front surface of the holographic screen 42.

The keypad 410 includes a plurality of keys 410a arranged thereon, preferably keys 410a which can be touched to input data by fingers. The keys 410a may include number keys, letter keys, function keys, a communication key, a deletion key and so on.

According to the construction described above, after the holographic screen 42 is completely opened from the main housing 40, when light is emitted from the optic source 460 toward the microdisplay LCD 461, the emitted light is reflected and converted to image-light by the microdisplay LCD 461, and then the image-light is transmitted toward the mirror 462. Then, the image-light is reflected by the mirror 462 and is then oriented toward the optical projection element 463. Thereafter, the image-light diverges while passing through the optical projection element 463, and then is shed on the front surface of the holographic screen 42, thereby producing holographic images on the holographic screen 42. As a result, a user can view the holographic images displayed by the holographic screen 42 in a comfortable posture.

Additionally, signals from the speaker 420 may be transmitted by wire or wireless to an audio circuit installed in the main housing.

Figure 27:
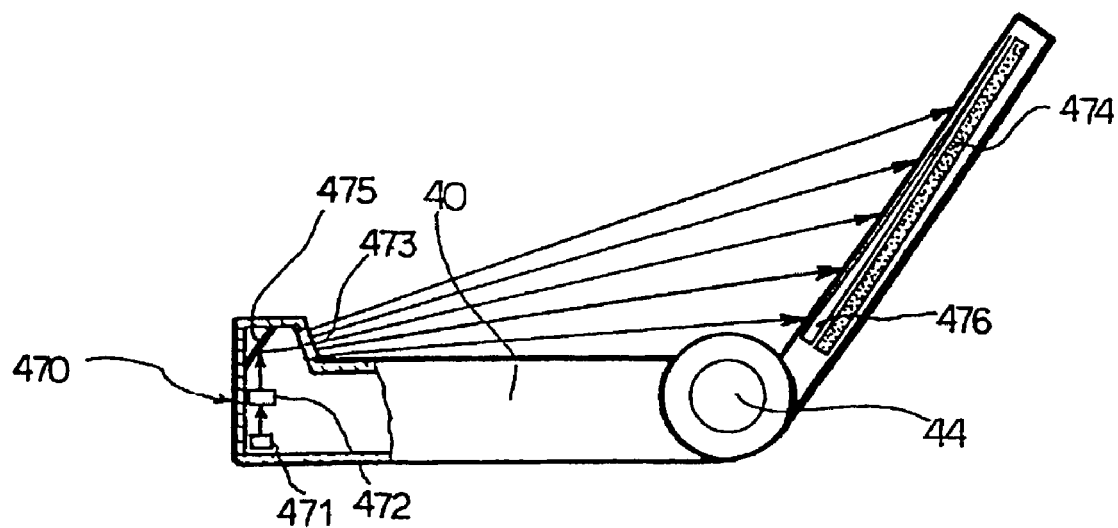
FIG. 27 is a partly cut-out side view of a portable terminal device employing a display unit according to the eighteenth preferred embodiment of the present invention.

FIG. 27 is a partly cut-out side view of a portable terminal device employing a display unit according to the eighteenth embodiment of the present invention. As shown in FIG. 27, the portable terminal device includes a main housing 40, a hologram screen 474, a hinge means 44 for rotatably assembling the main housing 40 and the hologram screen 474 with each other, and an optical system 470 for providing the holographic screen 474 with holographic image-light. The holographic screen 474 includes a light-refracting medium 476 in contact therewith.

It is preferred that the holographic screen 474 is a holographic reflection screen, since the image-light projected from the optic system 470 is shed on the front surface of the holographic screen 474.

It is preferred that the optical system 470 is disposed at a location which is advantageous in enabling the optical system 470 to shed the image-light on the front surface of holographic screen 474 when the holographic screen 474 has been completely opened. That is, it is preferred that the optical system 470 is disposed in front of the main housing 40. The optical system 470 includes an optic source 471, a microdisplay LCD 472, a mirror 475, and an optical projection element 473. The microdisplay LCD 472 is disposed above and spaced apart from the optic source 471, and receives light emitted from the optic source 471 and emits image-light by means of the received light. The mirror 475 reflects the image-light, which is reflected from the microdisplay LCD 472, at a predetermined angle. The optical projection element 473 causes the image-light, which is reflected from the mirror 475, to diverge toward the holographic screen 474. It is preferred that the optic source 471 is a light-emitting diode, more preferably one selected from white, red, or blue light-emitting diodes. It is also preferred that the microdisplay LCD 472 is a projection LCD, and the optical projection element 473 is a divergence lens. Further, the holographic screen 474 is preferably a holographic reflection screen, since the image-light is shed on the front surface of the holographic screen 474.

According to the construction described above, after the holographic screen 474 is completely opened from the main housing 40, when light is emitted from the optic source 471 toward the microdisplay LCD 472, the emitted light is transmitted through and converted to image-light by the microdisplay LCD 472, and then the image-light is transmitted toward the mirror 475. Then, the image-light is reflected by the mirror 475 and is then oriented toward the optical projection element 473. Thereafter, the image-light diverges while passing through the optical projection element 473, and then is shed on the front surface of the holographic screen 474, thereby displaying holographic images on the holographic screen 474. As a result, a user can view the holographic images displayed by the holographic screen in a comfortable posture.

As apparent from the above description, the portable terminal device according to the present invention has a display unit which employs a holographic screen and an optical system, thereby enabling the size of the portable terminal device to be reduced and the design of portable terminal device to be diversified, and highly improving the reliability of the portable terminal device.

Further, the present invention enables information to be displayed by means of a holographic screen.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable terminal device comprising:
   a main housing;
   an auxiliary housing, integral with and extending from the main housing in a longitudinal direction of the main housing such that the upper surface of the main housing and the upper surface of the auxiliary housing are located in the same plane to form a plane surface;
   a hinge means protruding upward between the main housing and the auxiliary housing and above the plane surface formed by the main housing and the auxiliary housing;
   a holographic screen assembled with the hinge means in such a manner that the holographic screen can be rotated about the hinge means to one of expose and cover the main housing, the holographic screen being disposed nearer to the auxiliary housing when exposed and nearer to the main housing when covered according to rotation of the folder, the holographic screen optically displaying information by means of image-light which is projected to the holographic screen; and
   an optical system spaced apart from the holographic screen, the optical system providing the holographic screen with the image-light when the holographic screen is opened from the main housing while being inclined at a predetermined angle.

2. A portable terminal device as claimed in claim 1, wherein the holographic screen is a holographic projection screen.

3. A portable terminal device as claimed in claim 1, wherein the holographic screen includes a light-refracting medium opposed to the holographic screen.

4. A portable terminal device as claimed in claim 1, wherein the optical system comprises:
   an optic source;
   a microdisplay LCD spaced apart from the optic source, the microdisplay LCD receiving light emitted from the optic source and emitting the image-light by means of the light incident thereto; and
   a divergence lens arranged between the holographic screen and the microdisplay LCD, the divergence lens causing the image-light, which is incident from the microdisplay LCD, to diverge toward the holographic screen.

5. A portable terminal device as claimed in claim 4, wherein the optic source is a light-emitting diode, selected from one of white, red, and blue light-emitting diodes.

* * * * *